(12) United States Patent
Lee et al.

(10) Patent No.: US 11,457,380 B2
(45) Date of Patent: Sep. 27, 2022

(54) TERMINAL DEVICE, BASE STATION DEVICE, AND COMMUNICATION METHOD

(71) Applicants: SHARP KABUSHIKI KAISHA, Sakai (JP); FG Innovation Company Limited, Tuen Mun (HK)

(72) Inventors: Taewoo Lee, Sakai (JP); Shoichi Suzuki, Sakai (JP); Wataru Ouchi, Sakai (JP); Tomoki Yoshimura, Sakai (JP); Liqing Liu, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/045,635

(22) PCT Filed: Apr. 5, 2019

(86) PCT No.: PCT/JP2019/015185
§ 371 (c)(1),
(2) Date: Oct. 6, 2020

(87) PCT Pub. No.: WO2019/194310
PCT Pub. Date: Oct. 10, 2019

(65) Prior Publication Data
US 2021/0160732 A1 May 27, 2021

(30) Foreign Application Priority Data

Apr. 6, 2018 (JP) .............................. JP2018-073685

(51) Int. Cl.
*H04W 28/06* (2009.01)
*H04L 1/00* (2006.01)
(Continued)

(52) U.S. Cl.
CPC ............. *H04W 28/06* (2013.01); *H04L 1/004* (2013.01); *H04L 1/0013* (2013.01); *H04L 1/1893* (2013.01); *H04W 72/0413* (2013.01)

(58) Field of Classification Search
CPC .................... H04W 28/06; H04W 72/0413; H04L 1/0013; H04L 1/004; H04L 1/1893; H04L 1/0067; H04L 1/0072
See application file for complete search history.

(56) References Cited

U.S. PATENT DOCUMENTS 11,095,397 B2 * 8/2021 Jang ...................... H03M 13/09
2016/0183244 A1 * 6/2016 Papasakellariou .... H04L 5/0057
370/329

(Continued)

FOREIGN PATENT DOCUMENTS

EP 3734924 A1 11/2020
JP 2010-527184 A 8/2010

OTHER PUBLICATIONS

Huawei, "draftCR to 38 212 capturing RAN1#92 meeting agreements", R1-1803544, 3GPP TSG RAN WG1 Meeting #92, Athens, Feb. 26-Mar. 1, 2018.

(Continued)

Primary Examiner — Min Jung
(74) Attorney, Agent, or Firm — ScienBiziP, P.C.

(57) ABSTRACT

A terminal apparatus including a coding unit configured to code a payload of uplink control information (UCI) and to perform rate matching of coded bits of the payload and a transmitter configured to transmit the UCI, wherein the payload includes part or all of hybrid automatic repeat request-acknowledgement (HARQ-ACK) information, a scheduling request, and channel state information (CSI), a length $E_{UCI}$ of an output sequence of the rate matching is given based on a first number $O_{CRC}$ of cyclic redundancy check (CRC) bits, the first number $O_{CRC}$ of CRC bits is (Continued)

given based on a size of the payload, and a size of second CRC bits added to the payload is given based on the size of the payload and the length $E_{UCI}$ of the output sequence of the rate matching.

3 Claims, 11 Drawing Sheets

(51) Int. Cl.
*H04L 1/18* (2006.01)
*H04W 72/04* (2009.01)

(56) References Cited

U.S. PATENT DOCUMENTS

| | | | |
|---|---|---|---|
| 2019/0045536 A1* | 2/2019 | Gao | H04L 5/0048 |
| 2021/0068140 A1* | 3/2021 | Yang | H04L 1/08 |
| 2021/0092732 A1* | 3/2021 | Lee | H04L 1/0061 |
| 2021/0152289 A1* | 5/2021 | Lee | H04L 5/0055 |
| 2021/0191806 A1 | 6/2021 | Pan | |
| 2021/0273746 A1* | 9/2021 | Jeong | H03M 13/134 |

OTHER PUBLICATIONS

Sharp, "Discussions on RB selection for PUCCH resource", R1-1804882, 3GPP TSG RAN WG1#92b Meeting, Sanya, China, Apr. 16-Apr. 20, 2018.
Intel Corporation, "UE procedure for multiplexing HARQ-ACK/SR and CSI", R1-1800330, 3GPP TSG RAN WG1 Meeting AH 1801, Vancouver, Canada, Jan. 22-26, 2018.
Huawei, "CR to 38.212 capturing the Jan. 18 ad-hoc and RAN1#92 meeting agreements", R1-1803553, 3GPP TSG RAN WG1 Meeting #92, Athens, Feb. 26-Mar. 1, 2018.

* cited by examiner

TERMINAL DEVICE, BASE STATION DEVICE, AND COMMUNICATION METHOD

TECHNICAL FIELD

The present invention relates to a terminal apparatus, a base station apparatus, and a communication method. This application claims priority based on JP 2018-07368 filed on Apr. 6, 2018, the contents of which are incorporated herein by reference.

BACKGROUND ART

A radio access method and a radio network for cellular mobile communications (hereinafter, referred to as "Long Term Evolution (LTE: registered trademark)," or "Evolved Universal Terrestrial Radio Access (EUTRA)") have been studied in the 3rd Generation Partnership Project (3GPP). Further, in 3GPP, a new radio access method (hereinafter referred to as "New Radio (NR)") is being studied (NPLs 1, 2, 3, 4). In LTE, a base station apparatus is also referred to as an evolved NodeB (eNodeB). In NR, a base station apparatus is also referred to as a gNodeB. In LTE, and in NR, a terminal apparatus is also referred to as a User Equipment (UE). LTE, as well as NR, is a cellular communication system in which multiple areas are deployed in a cellular structure, with each of the multiple areas being covered by a base station apparatus. A single base station apparatus may manage multiple cells.

In NR, a set of downlink BWP (bandwidth part) and uplink BWP is configured for one serving cell (NPL 3). The terminal apparatus receives PDCCH and PDSCH in the downlink BWP.

CITATION LIST

Non Patent Literature

NPL 1: "3GPP TS 38.211 V15.0.0 (2018-03), NR; Physical channels and modulation", R1-1803552, 14 Mar., 2018.
NPL 2: "3GPP TS 38.212 V15.0.0 (2018-03), NR; Multiplexing and channel coding", R1-1803553, 14 Mar., 2018.
NPL 3: "3GPP TS 38.213 V15.0.0 (2018-03), NR; Physical layer procedures for control", R1-1803554, 14 Mar., 2018.
NPL 4: "3GPP TS 38.214 V15.0.0 (2018-03), NR; Physical layer procedures for data", R1-1803555, 8 Mar., 2018.

SUMMARY OF INVENTION

Technical Problem

One aspect of the present invention provides a terminal apparatus capable of efficiently performing uplink transmission, a communication method used for the terminal apparatus, a base station apparatus capable of efficiently performing uplink transmission, and a communication method used for the base station apparatus.

Solution to Problem (1) A first aspect according to the present invention is a terminal apparatus including a coding unit configured to code a payload of uplink control information (UCI) and to perform rate matching of coded bits of the payload; and a transmitter configured to transmit the UCI, wherein the payload includes part or all of hybrid automatic repeat request-acknowledgement (HARQ-ACK) information, a scheduling request, and channel state information (CSI), a length $E_{UCI}$ of an output sequence of the rate matching is given based on a first number $O_{CRC}$ of cyclic redundancy check (CRC) bits, the first number $O_{CRC}$ of CRC bits is given based on a size of the payload, and a size of second CRC bits added to the payload is given based on the size of the payload and the length $E_{UCI}$ of the output sequence of the rate matching.

(2) A second aspect according to the present invention is a terminal apparatus including a transmitter configured to transmit a physical uplink control channel (PUCCH), wherein a number $N_{CSI\text{-}part2}^{reported}$ of pieces of channel state information (CSI) part 2 transmitted on the PUCCH is given such that a sum of a total sum of the $N_{CSI\text{-}part2}^{reported}+1$ pieces of CSI part 2 and a first number $O_{CRC,CSI\text{-}part2}$ of cyclic redundancy check (CRC) bits is larger than $W_M$, the first number of CRC bits is given based on the total sum of the $N_{CSI\text{-}part2}^{reported}+1$ pieces of CSI part 2, and the $N_{CSI\text{-}part2}^{reported}+1$ pieces of CSI part 2 include pieces of CSI part 2 with priorities from a first priority to an $N_{CSI\text{-}part2}^{reported}+1$-th priority.

(3) A third aspect according to the present invention is a base station apparatus including a receiver configured to decode a payload of uplink control information (UCI) and receive the UCI, wherein the payload includes part or all of hybrid automatic repeat request-acknowledgement (HARQ-ACK) information, a scheduling request, and channel state information (CSI), a length EUCI of an output sequence of rate matching of coded bits in the payload by a terminal apparatus is given based on a first number OCRC of cyclic redundancy check (CRC) bits, the first number OCRC of CRC bits is given based on a size of the payload, and a size of second CRC bits added to the payload is given based on the size of the payload and the length EUCI of the output sequence of the rate matching. Here, the base station apparatus may decode the payload of the UCI based on the length $E_{UCI}$ of the output sequence.

(4) A fourth aspect according to the present invention is a base station apparatus including a receiver configured to receive a physical uplink control channel (PUCCH), wherein a number NCSI-part2reported of pieces of channel state information (CSI) part 2 transmitted on the PUCCH is given such that a sum of a total sum of the NCSI-part2reported+1 pieces of CSI part 2 and a first number OCRC,CSI-part2 of cyclic redundancy check (CRC) bits is larger than $W_M$, the first number of CRC bits is given based on the total sum of the NCSI-part2reported+1 pieces of CSI part 2, and the NCSI-part2reported+1 pieces of CSI part 2 include pieces of CSI parts 2 with priorities from a first priority to an NCSI-part2reported+1-th priority.

(5) A fifth aspect according to the present invention is a communication method used for a terminal apparatus, the communication method including: coding a payload of uplink control information (UCI); performing rate matching of coded bits in the payload; and transmitting the UCI, wherein the payload includes part or all of hybrid automatic repeat request-acknowledgement (HARQ-ACK) information, a scheduling request, and channel state information (CSI), a length EUCI of an output sequence of the rate matching is given based on a first number OCRC of cyclic redundancy check (CRC) bits, the first number OCRC of CRC bits is given based on a size of the payload, and a size of second CRC bits added to the payload is given based on the size of the payload and the length EUCI of the output sequence of the rate matching.

(6) A sixth aspect according to the present invention is a communication method used for a terminal apparatus, the communication method including transmitting a physical uplink control channel (PUCCH), wherein a number $N_{CSI\text{-}part2}^{reported}$ of pieces of channel state information (CSI) part 2 transmitted on the PUCCH is given such that a sum of a total sum of the $N_{CSI\text{-}part2}^{reported}+1$ pieces of CSI part 2 and a first number $O_{CRC,CSI\text{-}part2}$ of cyclic redundancy check (CRC) bits is larger than $W_M$, the first number of CRC bits is given based on the total sum of the $N_{CSI\text{-}part2}^{reported}+1$ pieces of CSI part 2, and the $N_{CSI\text{-}part2}^{reported}+1$ pieces of CSI part 2 include pieces of CSI part 2 with priorities from a first priority to an $N_{CSI\text{-}part2}^{reported}+1$-th priority.

(7) A seventh aspect according to the present invention is a communication method used for a base station apparatus, the communication method including: decoding a payload of uplink control information (UCI); performing rate matching of decoded bits in the payload; and receiving the UCI, wherein the payload includes part or all of hybrid automatic repeat request-acknowledgement (HARQ-ACK) information, a scheduling request, and channel state information (CSI), a length EUCI of an output sequence of rate matching of coded bits in the payload by a terminal apparatus is given based on a first number OCRC of cyclic redundancy check (CRC) bits, the first number OCRC of CRC bits is given based on a size of the payload, and a size of second CRC bits added to the payload is given based on the size of the payload and the length EUCI of the output sequence of the rate matching.

(8) A eighth aspect according to the present invention is a communication method used for a base station apparatus, the communication method including receiving a physical uplink control channel (PUCCH), wherein a number $N_{CSI\text{-}part2}^{reported}$ of pieces of channel state information (CSI) part 2 transmitted on the PUCCH is given such that a sum of a total sum of the $N_{CSI\text{-}part2}^{reported}+1$ pieces of CSI part 2 and a first number $O_{CRC,CSI\text{-}part2}$ of cyclic redundancy check (CRC) bits is larger than $W_M$, the first number of CRC bits is given based on the total sum of the $N_{CSI\text{-}part2}^{reported}+1$ pieces of CSI part 2, and the $N_{CSI\text{-}part2}^{reported}+1$ pieces of CSI part 2 include pieces of CSI part 2 with priorities from a first priority to an $N_{CSI\text{-}part2}^{reported}+1$-th priority.

Advantageous Effects of Invention

According to one aspect of the present invention, the terminal apparatus can efficiently perform uplink transmission. In addition, the base station apparatus can efficiently perform uplink transmission.

DESCRIPTION OF EMBODIMENTS

Embodiments of the present invention will be described below.

Figure 1:
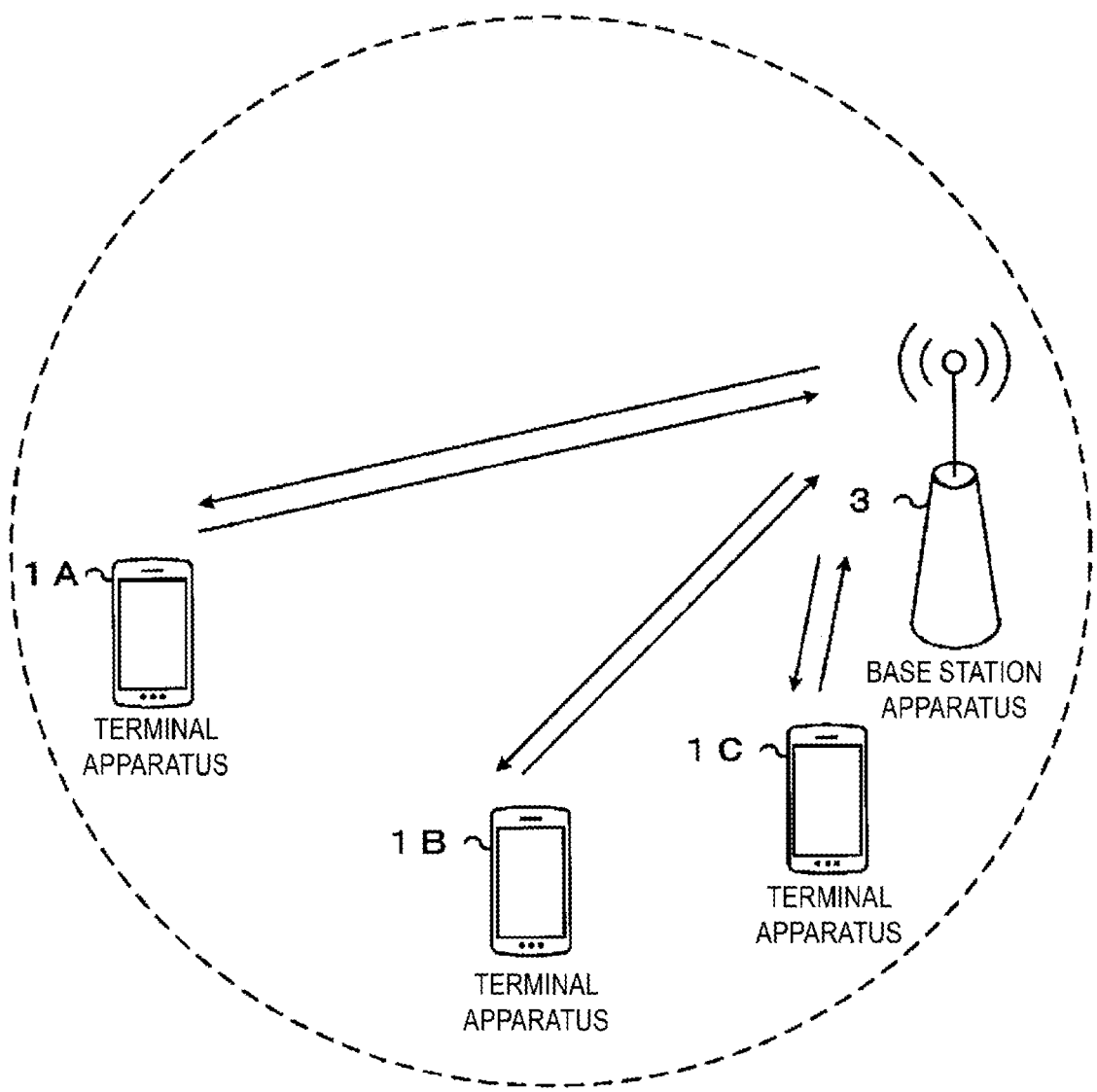
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. The terminal apparatuses 1A to 1C are each referred to as a terminal apparatus 1.

Physical channels and physical signals according to the present embodiment will be described.

In uplink radio communication from the terminal apparatus 1 to the base station apparatus 3, the following uplink physical channels are used. The uplink physical channels are used for transmitting information output from a higher layer.

Physical Uplink Control Channel (PUCCH)

Physical Uplink Shared Channel (PUSCH)

Physical Random Access Channel (PRACH)

The PUCCH is used for the terminal apparatus 1 to transmit Uplink Control Information (UCI) to the base station apparatus 3. Note that in the present embodiment, the terminal apparatus 1 may transmit the PUCCH in a primary cell and/or a secondary cell having a function of the primary cell and/or a secondary cell capable of transmitting the PUCCH. Specifically, the PUCCH may be transmitted in a particular serving cell.

The uplink control information includes at least one of downlink channel state information (CSI), a scheduling request (SR) indicating a request for a PUSCH resource, or a hybrid automatic repeat request acknowledgement (HARQ-ACK) for downlink data (a transport block, a medium access control protocol data unit (MAC PDU), a downlink-shared channel (DL-SCH), or a physical downlink shared channel (PDSCH)).

The HARQ-ACK is also referred to as an ACK/NACK, HARQ feedback, HARQ-ACK feedback, a HARQ response, a HARQ-ACK response, HARQ information, HARQ-ACK information, HARQ control information, and HARQ-ACK control information. In a case that downlink data is successfully decoded, an ACK for the downlink data is generated. In a case that the downlink data is not successfully decoded, a NACK for the downlink data is generated. Discontinuous Transmission (DTX) may mean that the downlink data has not been detected. The discontinuous Transmission (DTX) may mean that data for which a HARQ-ACK response is to be transmitted has not been detected. The HARQ-ACK may include at least a HARQ-ACK bit corresponding to at least one transport block. The HARQ-ACK bit may indicate an acknowledgement (ACK) or a negative-acknowledgement (NACK) corresponding to one or multiple transport blocks. The HARQ-ACK may include at least a HARQ-ACK codebook including one or multiple HARQ-ACK bits. The HARQ-ACK bit corresponding to one or multiple transport blocks may be the HARQ-ACK bit corresponding to a PDSCH including the one or multiple transport blocks.

The HARQ-ACK may indicate an ACK or an NACK corresponding to one Code Block Group (CBG) included in the transport block. The HARQ-ACK is also referred to as HARQ feedback, HARQ information, and HARQ control information.

The channel state information (CSI) may include a channel quality indicator (CQI) and a rank indicator (RI). The channel quality indicator may include a Precoder Matrix Indicator (PMI) and CSI-RS indicator (CRI). The channel state information may include a precoder matrix indicator. The CQI is an indicator associated with channel quality (propagation strength), and the PMI is an indicator indicating a precoder. The RI is an indicator indicating a transmission rank (or the number of transmission layers). The CSI is also referred to as a CSI report or CSI information.

The CSI report may be divided into one or multiple pieces. For example, in a case that the CSI report is divided into two, the divided first CSI report may be CSI-part 1 and the divided second a CSI report may be CSI-part 2. A size of the CSI report may be a number of bits of some or all of the pieces of the divided CSI. The size of the CSI report may be the number of bits of CSI-part 1. The size of the CSI report may be the number of bits of CSI-part 2. The size of the CSI report may be a total sum of the numbers of bits of the multiple divided CSI reports. The total sum of the numbers of bits of multiple pieces of divided CSI is the number of bits of the CSI report before being divided. CSI-part 1 may include at least a part or all of any of the RI, the CRI, the CQI, and the PMI. CSI-part 2 may include a part or all of any of the PMI, the CQI, the RI, and the CRI.

A Scheduling Request (SR) may be used at least to request a PUSCH resource for an initial transmission. A scheduling request bit may be used to indicate either a positive SR or a negative SR. The scheduling request bit indicating the positive SR is also referred to as a "positive SR is transmitted." The positive SR may indicate that the PUSCH resource for the initial transmission is requested by the terminal apparatus 1. The positive SR may indicate that a scheduling request is triggered by a higher layer. The positive SR may be transmitted in a case that a scheduling request is indicated to be transmitted by the higher layer. The scheduling request bit indicating the negative SR is also referred to as a "negative SR is transmitted." The negative SR may indicate that the PUSCH resource for the initial transmission is not requested by the terminal apparatus 1. The negative SR may indicate that a scheduling request is not triggered by the higher layer. The negative SR may be transmitted in a case that a scheduling request is not indicated to be transmitted by the higher layer.

The scheduling request bit may be used to indicate either a positive SR or a negative SR for either one or multiple SR configurations. Each of the one or multiple SR configurations may correspond to one or multiple logical channels. A positive SR for a given SR configuration may be a positive SR for any or all of the one or multiple logical channels corresponding to the given SR configuration. The negative SR may not correspond to a particular SR configuration. The negative SR being indicated may be the negative SR being indicated for the all SR configurations.

The SR configuration may be a Scheduling Request ID.

The PUSCH may be used to transmit uplink data (Transport block, Medium Access Control Protocol Data Unit (MAC PDU), or Uplink-Shared CHannel (UL-SCH)). The PUSCH may be used to transmit a HARQ-ACK and/or channel state information along with the uplink data. Furthermore, the PUSCH may be used to transmit only, the channel state information or to transmit only the HARQ-ACK and the channel state information. That is, the PUSCH may be used to transmit the uplink control information. The terminal apparatus 1 may transmit the PUSCH based on detection of PDCCH (Physical Downlink Control Channel) including uplink grant.

The PRACH may be used to transmit a random access preamble (random access message 1). The PRACH may be used to indicate at least some of an initial connection establishment procedure, a handover procedure, a connection re-establishment procedure, synchronization (timing adjustment) for transmission of uplink data, and a request for a PUSCH (UL-SCH) resource.

In uplink radio communication from the terminal apparatus 1 to the base station apparatus 3, the following uplink physical signals may be used. The uplink physical signals may not be used to transmit information output from a higher layer, but is used by a physical layer.

Uplink Reference Signal (UL RS)

According to the present embodiment, at least the following two types of uplink reference signal may be at least used.

Demodulation Reference Signal (DMRS)

Sounding Reference Signal (SRS)

The DMRS is associated with transmission of a PUSCH and/or a PUCCH. The DMRS may be multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. The DMRS may correspond to the PUSCH. Transmission of both of the PUCCH and the DMRS is hereinafter referred to simply as transmission of the PUCCH. The DMRS may correspond to the PUCCH.

The SRS may not be associated with transmission of the PUSCH and/or the PUCCH. An SRS may be associated with transmission of the PUSCH and/or the PUCCH. The base station apparatus 3 may use the SRS for measuring a channel state. The SRS may be transmitted in the last OFDM symbol or a predetermined number of OFDM symbols from the last OFDM symbol in an uplink slot.

The following downlink physical channels may be used for downlink radio communication from the base station apparatus 3 to the terminal apparatuses 1. The downlink physical channels may be used by the physical layer to transmit information output from the higher layer.

Physical Broadcast Channel (PBCH)

Physical Downlink Control Channel (PDCCH)

Physical Downlink Shared Channel (PDSCH)

The PBCH is used for broadcasting a Master Information Block (MIB) that is used commonly by one or multiple terminal apparatuses in a serving cell, in an active bandwidth part (BWP), or in a carrier. The PBCH may be transmitted at a prescribed transmission interval. For example, the PBCH may be transmitted at an interval of 80 ms. At least some of information included in the PBCH may be updated every 80 ms. The PBCH may include a predetermined number of sub carriers (e.g., 288 subcarriers) in the frequency domain. The PBCH may include 2, 3, or 4 OFDM symbols in the time domain. The MIB may include information on an identifier (index) of a synchronization signal.

The MIB may include information indicating at least some of numbers of a slot, a subframe, and a radio frame in which a PBCH is transmitted. First configuration information may be included in the MIB. The first configuration information may be configuration information used at least in some or all of a random access message 2, a random access message 3, and a random access message 4.

The PDCCH is used to transmit downlink control information (DCI). The downlink control information is also referred to as DCI format. Note that the DCI format may include one or multiple fields of the downlink control information. The downlink control information may include at least either an uplink grant or a downlink grant.

The uplink grant is used for scheduling of a single PUSCH in a single cell. The uplink grant may be used for scheduling multiple PUSCHs in multiple slots in a single cell. The uplink grant may be used for scheduling a single PUSCH in multiple slots in a single cell. The downlink control information including the uplink grant may be referred to as an uplink-related DCI format.

A single downlink grant is at least used for scheduling of a single PDSCH in a single serving cell. The downlink grant is at least used for the scheduling of the PDSCH in the same slot as the slot in which the downlink grant is transmitted. The downlink control information including the downlink grant may be referred to as a downlink-related DCI format.

The PDSCH is used to transmit downlink data (TB, MAC PDU, DL-SCH, PDSCH, CB, and CBG). The PDSCH is at least used to transmit a random access message 2 (random access response). The PDSCH is at least used to transmit system information including parameters used for initial access.

The BCH, UL-SCH, and DL-SCH described above are transport channels. A channel used in a Medium Access Control (MAC) layer is referred to as a transport channel. A unit of the transport channel used in the MAC layer is also referred to as a transport block or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a modulation process is performed for each codeword.

The base station apparatus 3 and the terminal apparatus 1 may exchange (transmit and/or receive) signals in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. Furthermore, the base station apparatus 3 and the terminal apparatus 1 may transmit and/or receive, in the MAC layer, a MAC Control Element (CE). Here, the RRC signaling and/or the MAC CE is also referred, to as higher layer signaling.

The PUSCH and the PDSCH are at least used to transmit the RRC signaling and the MAC CE. Here, the RRC signaling transmitted from the base station apparatus 3 on the PDSCH may be RRC signaling common to multiple terminal apparatuses 1 in a cell. The RRC signaling common to the multiple terminal apparatuses 1 in the cell is also referred to as common RRC signaling. The RRC signaling transmitted from the base station apparatus 3 on the PDSCH may be RRC signaling dedicated to a certain terminal apparatus 1 (which is also referred to as dedicated signaling or UE specific signaling). The RRC signaling dedicated to the terminal apparatus 1 is also referred to as dedicated RRC signaling. A cell specific parameter may be transmitted using the RRC signaling common to the multiple terminal apparatuses 1 in the cell or the RRC signaling dedicated to the certain terminal apparatus 1. A UE specific parameter may be transmitted using the RRC signaling dedicated to the certain terminal apparatus 1.

A configuration of the radio frame according to the present embodiment will be described below.

Figure 2:
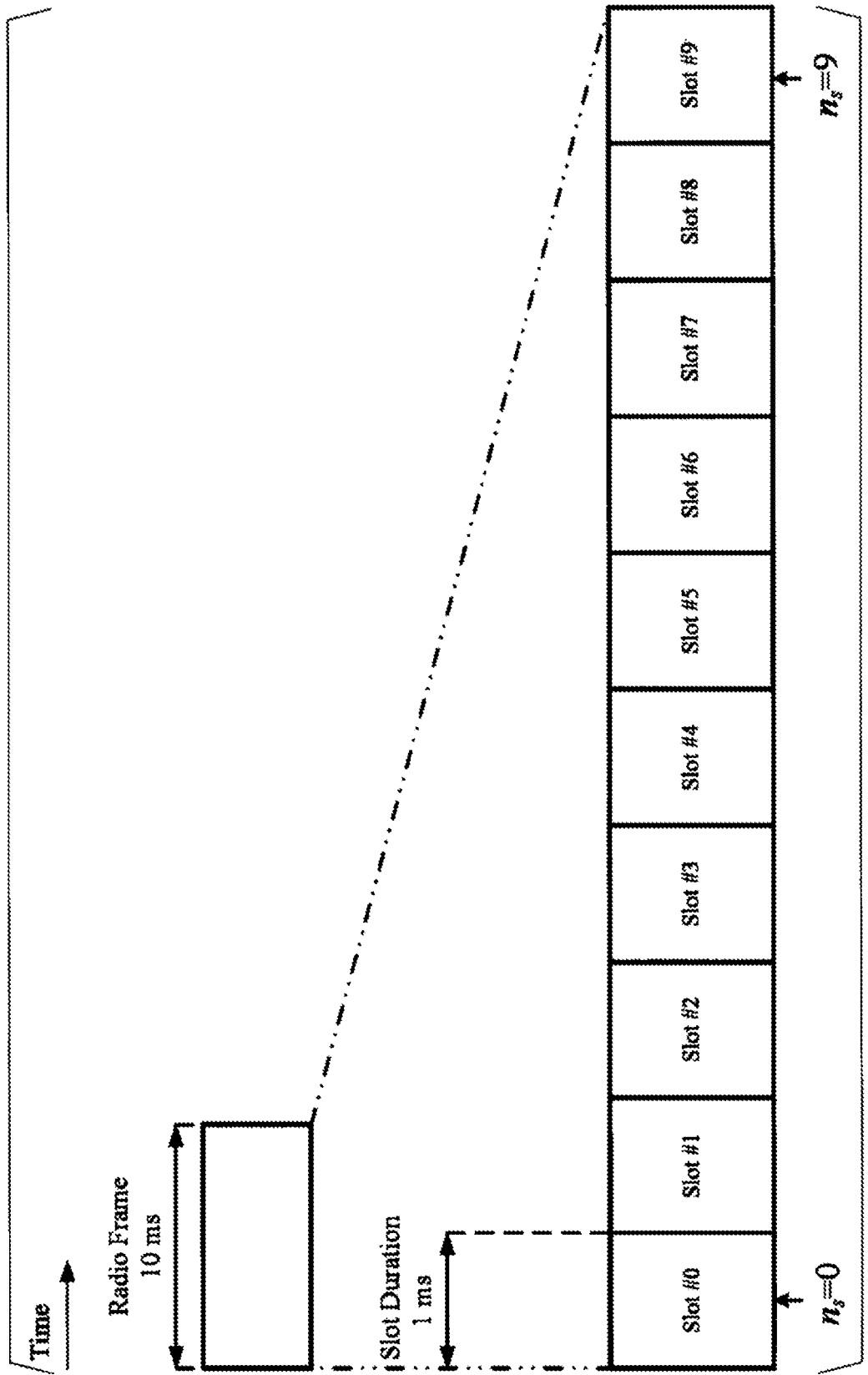
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of the radio frames may be 10 ms in length. Furthermore, each of the radio frames may include ten slots. Each of the slots may be 1 ms in length.

Figure 3:
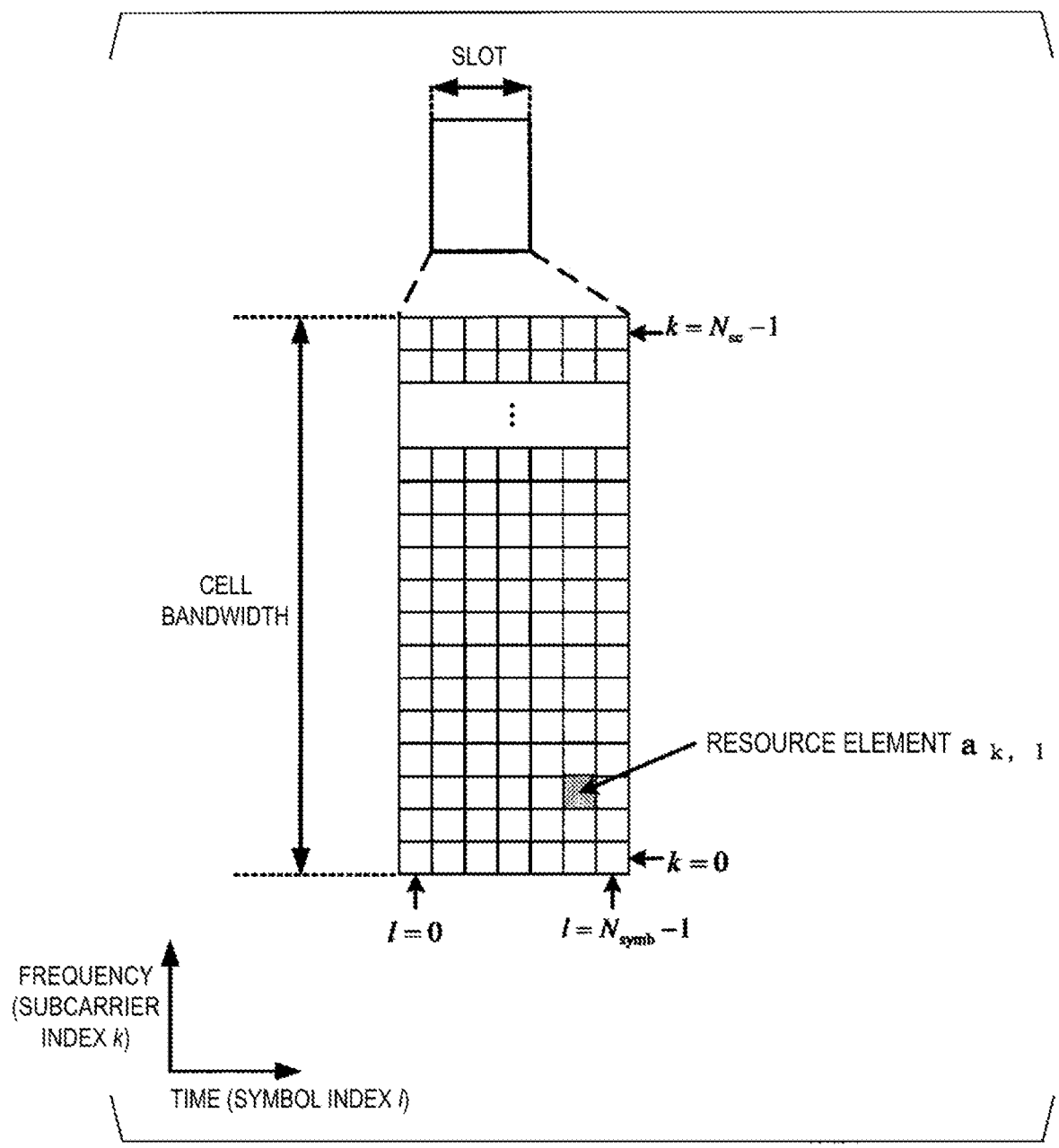
FIG. 3 is a diagram illustrating a schematic configuration of a uplink slot according to the present embodiment.

An example configuration of a slot according to the present embodiment will be described below. FIG. 3 is a diagram illustrating a schematic configuration of a uplink slot according to the present embodiment. FIG. 3 illustrates a configuration of a uplink slot in a cell. In FIG. 3, the horizontal axis is a time axis, and the vertical axis is a frequency axis. The uplink slot may include $N^{UL}_{symb}$ SC-FDMA symbols. The uplink slot may include $N^{UL}_{symb}$ OFDM symbols. Hereinafter, according to the present embodiment, a case where the uplink slot includes an OFDM symbol will be described, and the present embodiment is applicable to a case where the uplink slot includes a SC-FDMA symbol.

In FIG. 3, 1 is an OFDM symbol number/index, and k is a subcarrier number/index. The physical signal or the physical channel transmitted in each of the slots is represented by a resource grid. In uplink, the resource grid is defined by multiple subcarriers and multiple OFDM symbols. Each element in the resource grid is referred to as a resource element. The resource element is represented by a subcarrier number/index k and an OFDM symbol number/index 1.

The uplink slot may include multiple OFDM symbols 1 (1=0, 1, . . . , $N^{UL}_{symb}-1$) in the time domain. For a normal Cyclic Prefix (CP) in the uplink, $N^{UL}_{symb}$ may be 7 or 14 in a single uplink slot. For an extended CP in the uplink, $N^{DL}_{symb}$ may be 6 or 12.

The terminal apparatus 1 receives the parameter UL-CyclicPrefixLength of the higher layer indicating the CP length in the uplink from the base station apparatus 3. The base station apparatus 3 may broadcast, in the cell, system information including the parameter UL-CyclicPrefix-Length of the higher layer corresponding to the cell.

The uplink slot may include multiple subcarriers k (k=0, 1, . . . , $N^{DL}_{RB} N^{RB}_{SC}-1$) in the frequency domain. $N^{DL}_{RB}$ is an uplink bandwidth configuration for a serving cell and is expressed by a multiple of $N^{RB}_{SC}$. $N^{RB}_{SC}$ is a (physical) resource block size in the frequency domain represented by the number of subcarriers. The subcarrier spacing Δf may be 15 kHz. The $N^{RB}_{SC}$ may be 12. The (physical) resource block size in the frequency domain may be 180 kHz.

One physical resource block is defined by $N^{UL}_{symb}$ consecutive OFDM symbols in the time domain and $N^{RB}$sc consecutive subcarriers in the frequency domain. Hence, one physical resource block includes ($N^{UL}_{symb} \cdot N^{RB}$sc)) resource elements. One physical resource block may correspond to one slot in the time domain. The physical resource blocks may be numbered $n_{PRB}$ (0, 1, . . . , $N^{UL}_{RB}-1$) in an ascending order of frequencies in the frequency domain.

The downlink slot according to the present embodiment includes multiple OFDM symbols and/or SC-FDMA symbols. Since the slot configuration of the downlink according to the present embodiment is basically the same as the slot configuration of the uplink, the description of the configuration of the downlink slot will be omitted.

Configurations of apparatuses according to the present embodiment will be described below.

Figure 4:
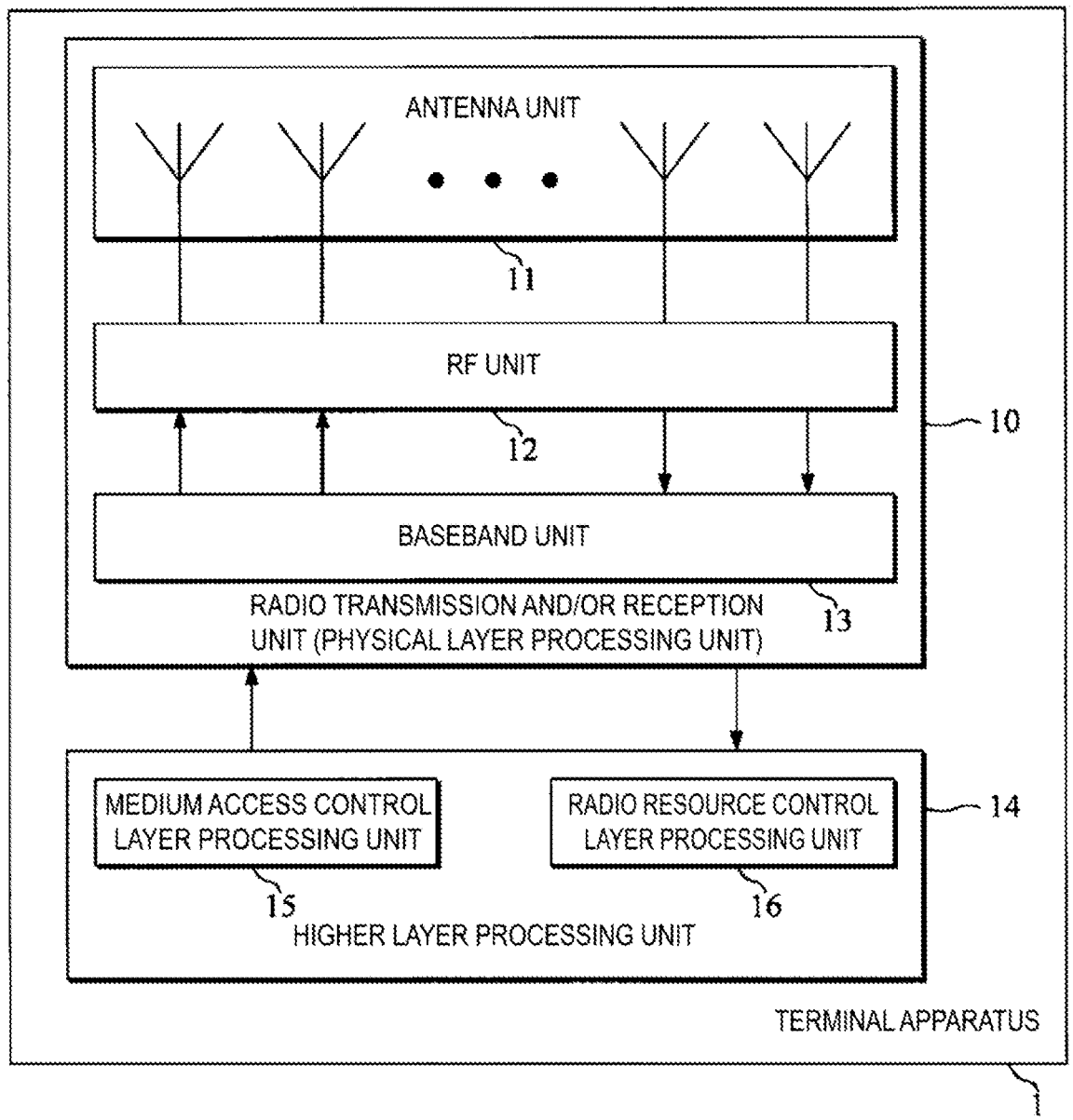
FIG. 4 is a schematic block diagram illustrating a configuration of a terminal apparatus 1 according to the present embodiment.

FIG. 4 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver, a coding unit, a decoding unit, or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls random access procedure in accordance with various types of configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. Namely, the radio resource control layer processing unit 16 sets the various configuration information/parameters in accordance with the information for indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation, and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 5:
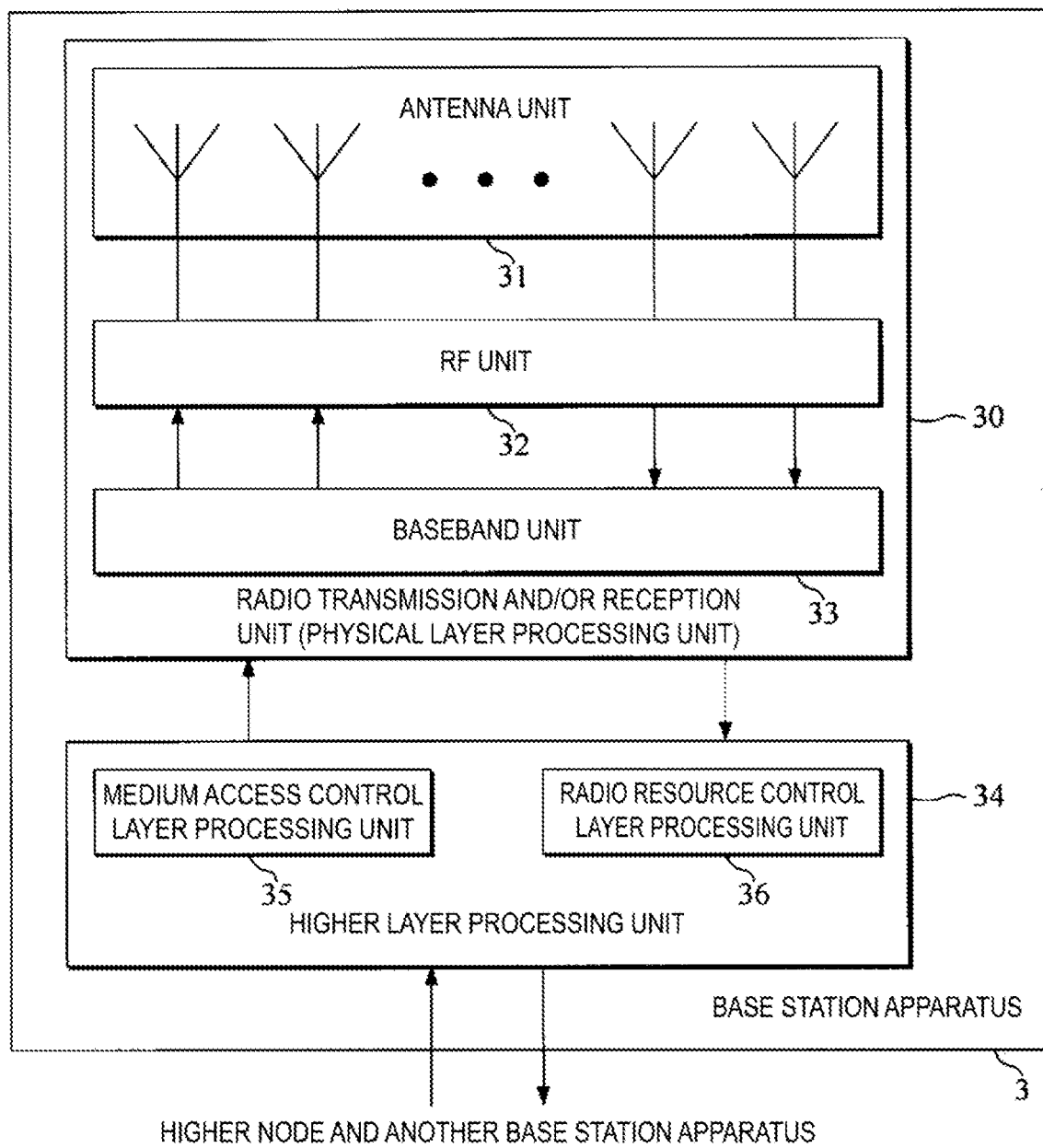
FIG. 5 is a schematic block diagram illustrating a configuration of a base station apparatus 3 according to the present embodiment.

FIG. 5 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver, a coding unit, a decoding unit, or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 controls random access procedure in accordance with various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/reports information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit. Each of the units that are included in the terminal apparatus 1 and have the reference signs 10 to 16 may be configured as at least one processor and a memory coupled to the at least one processor. Each of the units that are included in the base station apparatus 3 and have the reference signs 30 to 36 may be configured as at least one processor and a memory coupled to the at least one processor.

Time Division Duplex (TDD) and/or Frequency Division Duplex (FDD) may be applied to a radio communication system according to the present embodiment. In a case of a cell aggregation, serving cells to which TDD is applied and serving cells to which FDD is applied may be aggregated.

Note that, the higher layer signaling may be any one of Remaining Minimum System Information (RMSI), Other System Information (OSI), a System Information Block (SIB), a Radio Resource Control (RRC) message, and a Medium Access Control (MAC) Control Element (CE). A higher layer parameter may refer to a parameter or information element included in higher layer signaling.

The UCI transmitted on the PUCCH may include a HARQ-ACK, a scheduling request, and/or CSI.

The terminal apparatus 1 configures a resource (PUCCH resource) for PUCCH transmission in a PUCCH format, based on one or multiple higher layer parameters. A higher layer parameter PUCCH-resource-config-PF0 is used to configure one or multiple PUCCH resources for PUCCH transmission in PUCCH format 0. A higher layer parameter PUCCH-resource-config-PF1 is used to configure one or multiple PUCCH resources for PUCCH transmission in PUCCH format 1. A higher layer parameter PUCCH-resource-config-PF2 is used to configure one or multiple PUCCH resources for PUCCH transmission in PUCCH format 2. A higher layer parameter PUCCH-resource-config-PF3 is used to configure one or multiple PUCCH resources for PUCCH transmission in PUCCH format 3. A higher layer parameter PUCCH-resource-config-PF4 is used to configure one or multiple PUCCH resources for PUCCH transmission in PUCCH format 4.

Here, the PUCCH format may be defined based on at least a value and type of the higher layer parameter used for the PUCCH resource configuration corresponding to the PUCCH format, and/or the number of UCI bits that can be transmitted on the PUCCH resource corresponding to the PUCCH format. For example, PUCCH format 0 may have a length of one or two OFDM symbols, and the number of UCI bits may be one or two bits. PUCCH format 1 may have a length of equal to or larger than four OFDM symbols, and the number of UCI bits may be one or two bits. PUCCH format 2 may have a length, of one or two OFDM symbols, and the number of UCI bits may be equal to or larger than 3. PUCCH format 3 may have a length of equal to or larger than four OFDM symbols, and the number of UCI bits may be equal to or larger than three. PUCCH format 4 may have a length of equal to or larger than four OFDM symbols, and the number of UCI bits may be equal to or larger than three. The PUCCH resource configured in PUCCH format 4 may include an OCC.

One or multiple PUCCH resource sets may be configured by a higher layer parameter PUCCH-resource-set. The terminal apparatus 1 may configure the number of PUCCH resources included in one PUCCH resource set by a higher layer parameter PUCCH-resource-set-size. The terminal apparatus 1 may determine the PUCCH resource set in accordance with the number A of UCI bits. In a case that the number A of UCI bits is equal to or smaller than $N_1$, the terminal apparatus 1 determines a first PUCCH resource set. In a case that the number A of UCI bits is larger than $N_1$ and is equal to or smaller than $N_2$, the terminal apparatus 1 determines a second PUCCH resource set. In a case that the number A of UCI bits is equal to or larger than $N_2$ and equal to or smaller than $N_3$, the terminal apparatus 1 determines a third PUCCH resource set. In a case that the number A of UCI bits is equal to or larger than $N_3$ and equal to or smaller than Na, the terminal apparatus 1 determines a fourth PUCCH resource set. $N_1$ may be 2. $N_2$, $N_3$, and Na may be configured by the higher layer parameters.

In a case that the terminal apparatus 1 is not configured with the higher layer parameter PUCCH-resource-set for configuring the PUCCH resource set, the uplink BWP for PUCCH transmission with the HARQ-ACK information is indicated by SystemInformationBlockType1, and the PUCCH resource set is indicated by a higher layer parameter PUCCH-resource-common included in SystemInformationBlockType1.

In order for the terminal apparatus 1 to transmit the HARQ-ACK information using the PUCCH, the terminal apparatus 1 determines the PUCCH resource after determining the PUCCH resource set. The determination of the PUCCH resource is performed based on at least a value of a PUCCH resource indicator field included in DCI format 1_0 or DCI format 1_1 last detected by the terminal apparatus 1.

The terminal apparatus 1 transmits, on the PUCCH, the HARQ-ACK information corresponding to an order indicated by detected DCI format 1_0 or DCI format 1_1. The order of detected DCI format 1_0 or DCI format 1_1 is configured first with indexes between the cells in ascending order, and thereafter, with a PDCCH monitoring occasion. For example, in a case that the terminal apparatus 1 detects, in a serving cell 1, a DCI format A at a PDCCH monitoring occasion T and a DCI format B at a PDCCH monitoring occasion (T+1), and detects, in a serving cell 2, a DCI format C at the PDCCH monitoring occasion T and a DCI format D at a the PDCCH monitoring occasion (T+1), the terminal apparatus 1 transmits the HARQ-ACK information corresponding to each DCI format on the PUCCH in the order of the DCI format A, the DCI format C, the DCI format B, and the DCI format D. Here, the DCI format A, the DCI format B, the DCI format C, and the DCI format D may be a DCI format of at least either DCI format 1_0 or DCI format 1_1.

The terminal apparatus 1 performs mapping to a PUCCH resource index configured by a higher layer parameter PUCCH-resource-index indicated by a value of the PUCCH resource indicator field included in DCI format 1_0 or DCI format 1_1 detected from the PDCCH. The PUCCH resource index is an index of each of one or multiple PUCCH resources configured by the higher layer parameter PUCCH-resource-set-size. For example, four PUCCH resources are configured by the higher layer parameter PUCCH-resource-set-size in a certain PUCCH resource set, and a relationship between the value of the PUCCH resource indicator field and the PUCCH resource is configured by the higher layer parameter PUCCH-resource-index such that a PUCCH resource corresponding to a value of 00 of the PUCCH resource indicator field is the first PUCCH resource, a PUCCH resource corresponding to a value of 01 of the PUCCH resource indicator field is the second PUCCH resource, a PUCCH resource corresponding to a value of 10 of the PUCCH resource indicator field is the third PUCCH resource, and a PUCCH resource corresponding to a value of 11 of the PUCCH resource indicator field is the fourth PUCCH resource, and then, in a case that the value of the PUCCH resource indicator field included in DCI format 1_0 or DCI format 1_1 detected from the PDCCH by the terminal apparatus 1 is 10, the terminal apparatus 1 selects the third PUCCH resource.

Figure 6:
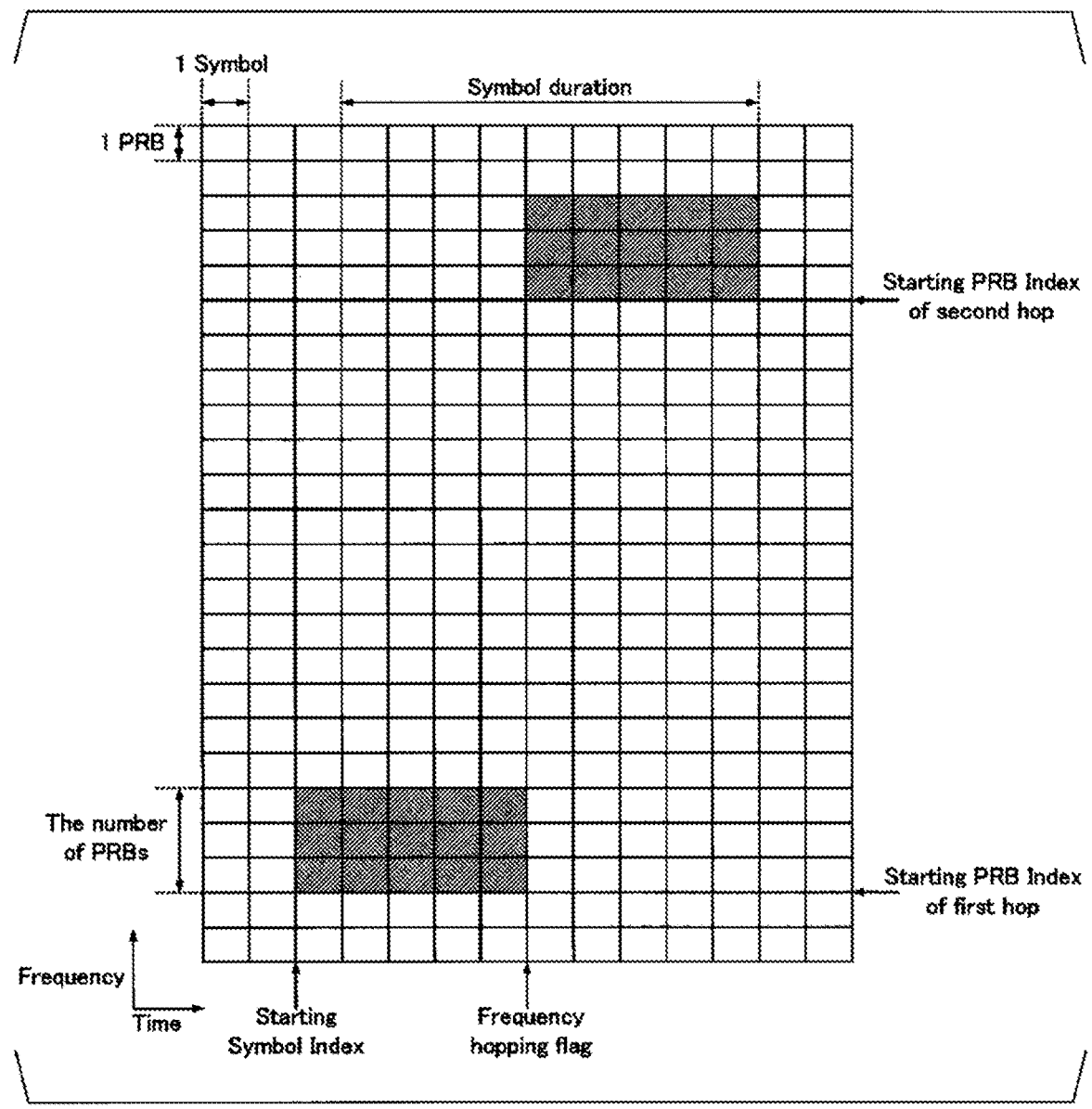
FIG. 6 is a diagram illustrating an example in which a PUCCH resource is configured by a higher layer parameter according to the present embodiment.

FIG. 6 is a diagram illustrating an example in which the PUCCH resource is configured by the higher layer parameter according to the present embodiment. One PUCCH resource set may be configured with one or multiple PUCCH resources. Each PUCCH resource may be provided at least based on, as illustrated in FIG. 6, some or all of a starting symbol index from which the PUCCH is mapped, the number of symbols (symbol duration), a starting PRB index of first hop in a case with or without frequency hopping, a starting PRB index of second hop in a case with frequency hopping, the number of PRBs, a frequency hopping flag, a cyclic shift index, and an OCC index. The multiple PUCCH resources configured to one PUCCH resource set may be indexed by a smaller index as the PUCCH resource having the number of PRBs is smaller. Specifically, a PUCCH resource 1 may have the number of PRBs fewer than or the same as a PUCCH resource 2. Here, the PRB is also referred to as a bandwidth or an RB.

PUCCH format 0 may be configured based on at least some or all of a starting symbol index, a symbol duration, a frequency hopping flag, a first hop in a case with frequency hopping and/or a starting PRB index in a case without frequency hopping, a starting PRB index of second hop in a case with frequency hopping, and a cyclic shift index.

PUCCH format 1 may be configured based on at least some or all of a starting symbol index, a symbol duration, a frequency hopping flag, a first hop in a case with frequency hopping and/or a starting PRB index in a case without frequency hopping, a starting PRB index of second hop in a case with frequency hopping, a cyclic shift index, and an OCC index.

PUCCH format 2 may be configured based on at least some or all of a starting symbol index, a symbol duration, a frequency hopping flag, a first hop in a case with frequency hopping and/or a starting PRB index in a case without frequency hopping, a starting PRB index of second hop in a case with frequency hopping, and the number of PRBs.

PUCCH format 3 may be configured based on at least some or all of a starting symbol index, a symbol duration, a frequency hopping flag, a first hop in a case with frequency hopping and/or a starting PRB index in a case without frequency hopping, a starting PRB index of second hop in a case with frequency hopping, and the number of PRBs.

PUCCH format 4 may be configured based on at least some or all of a starting symbol index, a symbol duration, a frequency hopping flag, a first hop in a case with frequency hopping and/or a starting PRB index in a case without frequency hopping, a starting PRB index of second hop in a case with frequency hopping, an OCC length, and an OCC index.

In a case that the PUCCH resource is configured in PUCCH format 0 or PUCCH format 2 in the PUCCH transmission, an initial symbol index is indicated by a higher layer parameter PUCCH-F0-F2-starting-symbol. In a case that the PUCCH resource is configured in PUCCH format 1, PUCCH format 3, or PUCCH format 4 in the PUCCH transmission, the initial symbol index is indicated by a higher layer parameter PUCCH-F1-F3-F4-starting-symbol.

In a case that the PUCCH resource is configured in PUCCH format 0 or PUCCH format 2 in the PUCCH transmission, the symbol duration is indicated by a higher layer parameter PUCCH-F0-F2-number-of-symbols. In a case that the PUCCH resource is configured in PUCCH format 1, PUCCH format 3, or PUCCH format 4 in the PUCCH transmission, the symbol duration is indicated by a higher layer parameter PUCCH-F1-F3-F4-number-of-symbols.

In the case without frequency hopping, an initial PRB index of the PUCCH resource used for PUCCH transmission is indicated by a higher layer parameter PUCCH-starting-PRB. In the case of the PUCCH resource with frequency hopping, an initial PRB index of the PUCCH resource used for PUCCH transmission in the first hopping is indicated by the higher layer parameter PUCCH-starting-PRB. In the case of the PUCCH resource with frequency hopping, an initial PRB index of the PUCCH resource used for PUCCH transmission in the second hopping is indicated by a higher layer parameter PUCCH-2nd-hop-PRB.

In a case that the terminal apparatus 1 transmits the PUCCH using PUCCH format 2, the number of PRBs used for the PUCCH transmission is indicated by a higher layer parameter PUCCH-F2-number-of-PRBs. In a case that the terminal apparatus 1 transmits the PUCCH using PUCCH format 3, the number of PRBs used for the PUCCH transmission is indicated by a higher layer parameter PUCCH-F3-number-of-PRBs.

Whether the terminal apparatus 1 performs frequency hopping of the PUCCH resource is indicated by a higher layer parameter PUCCH-frequency-hopping.

In a case that the terminal apparatus 1 transmits the PUCCH using PUCCH format 0 and/or PUCCH format 1, the cyclic shift index of the PUCCH resource is indicated by a higher layer parameter PUCCH-F0-F1-initial-cyclic-shift.

In a case that the terminal apparatus 1 transmits the PUCCH using PUCCH format 1, one or multiple values used in generating the Orthogonal Cover Code (OCC) are given based on at least the number of PUCCH symbols and a higher layer parameter PUCCH-F1-time-domain-OCC.

In a case that the terminal apparatus 1 transmits the PUCCH using PUCCH format 4, one or multiple values used in generating the Orthogonal Cover Code (OCC) are given based on at least the number of PUCCH symbols and a higher layer parameter PUCCH-F1-time-domain-OCC.

In PUCCH format 3, the terminal apparatus 1 may be configured with the number of DMRSs used for DMRS transmission by a higher layer parameter PUCCH-F3-F4-additional-DMRS. In PUCCH format 4, the terminal apparatus 1 may be configured with the number of DMRSs used for DMRS transmission by a higher layer parameter PUCCH-F3-F4-additional-DMRS.

Figure 8:
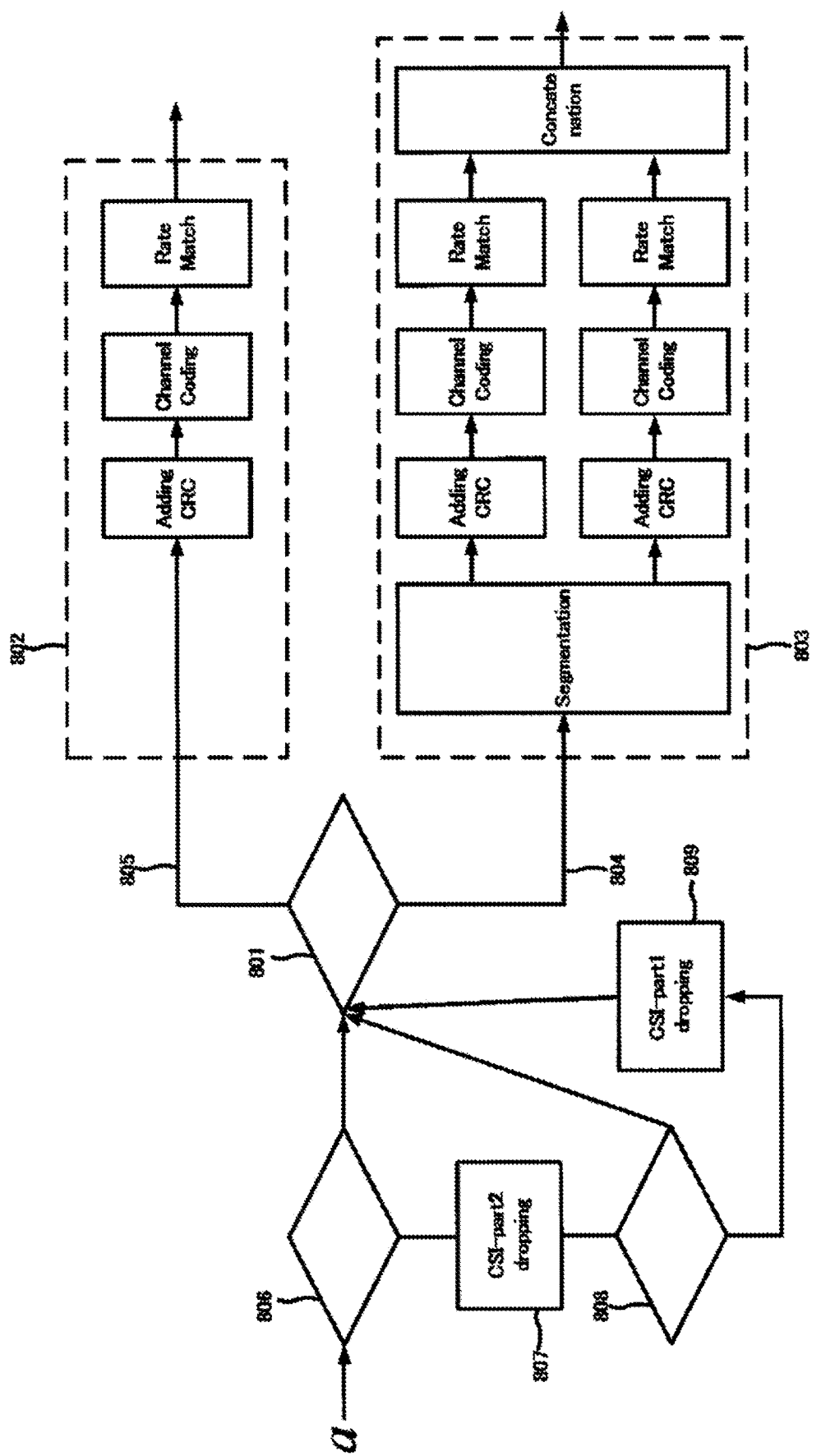
FIG. 8 is a diagram illustrating a code block segmentation based on a size A of a UCI payload a and a size of a rate matching output sequence $f^e_e$ according to the present embodiment.

In a case that the terminal apparatus 1 transmits a UCI payload including part or all of the HARQ-ACK information, the scheduling request, and the CSI, and CRC bits for the UCI payload in PUCCH format 2, the terminal apparatus 1 determines, as illustrated in a block 802 in FIG. 8, the minimum number of PRBs of the PUCCH resource that is configured by the higher layer parameter such that a coding rate of a codeword obtained by coding the UCI payload and the CRC bits for the UCI payload is equal to or lower than a coding rate given by a higher layer parameter PUCCH-F2-maximum-coderate. The minimum number of PRBs is given based on at least the number of bits of the UCI payload, the number of CRC bits for the UCI payload, the number of subcarriers per 1 PRB, the number of bits corresponding to the modulation scheme, and/or the maximum coding rate. The number of bits corresponding to the modulation scheme may be 1 in a case of pi/2-BPSK. The number of bits corresponding to the modulation scheme may be 2 in a case of QPSK.

In a case that the terminal apparatus 1 transmits a UCI payload including part or all of the HARQ-ACK information, the scheduling request, and the CSI, and CRC bits for the UCI payload in PUCCH format 3, the terminal apparatus 1 determines, as illustrated in a block 802 in FIG. 8, the minimum number of PRBs of the PUCCH resource that is configured by the higher layer parameter such that a coding rate of a codeword obtained by coding the UCI payload and the CRC bits for the UCI payload is equal to or lower than a coding rate given by a higher layer parameter PUCCH-F3-maximum-coderate. The minimum number of PRBs is given based on at least the number of bits of the UCI payload, the number of CRC bits for the UCI payload, the number of subcarriers per 1 PRB, the number of bits corresponding to the modulation scheme, and/or the maximum coding rate. The number of bits corresponding to the modulation scheme may be 1 in a case of pi/2-BPSK. The number of bits corresponding to the modulation scheme may be 2 in a case of QPSK.

In a case that the terminal apparatus 1 transmits a UCI payload including part or all of the HARQ-ACK information, the scheduling request, and the CSI, and CRC bits for the UCI payload in PUCCH format 2, and a size of the UCI payload is equal to or larger than 360 bits, and an output of rate matching is equal to or larger than 1088 bits, the terminal apparatus 1, as illustrated in a block 803 in FIG. 8, performs Code block segmentation on the UCI payload including part or all of the HARQ-ACK information, the scheduling request, and the CSI, and adds a CRC bit to each code block segmented information bit (also referred to as a code block). The terminal apparatus 1 determines the minimum number of PRBs of the PUCCH resource that is configured by the higher layer parameter such that a coding rate of a codeword obtained by coding the UCI payload including at least some or all of the HARQ-ACK information, the scheduling request, and the CSI and the CRC bits for the UCI payload is equal to or lower than a coding rate given by a higher layer parameter PUCCH-F2-maximum-coderate. The minimum number of PRBs is given based on at least the number of bits of the UCI payload, the number of CRC bits for the UCI payload, the number of subcarriers per 1 PRB, the number of bits corresponding to the modulation scheme, and/or the maximum coding rate. The number of bits corresponding to the modulation scheme may be 1 in a case of pi/2-BPSK. The number of bits corresponding to the modulation scheme may be 2 in a case of QPSK.

In a case that the terminal apparatus 1 transmits a UCI payload including part or all of the HARQ-ACK information, the scheduling request, and the CSI, and CRC bits for the UCI payload a in PUCCH format 3, and a size of the UCI payload is equal to or larger than 360 bits, and an output of rate matching is equal to or larger than 1088 bits, the terminal apparatus 1, as illustrated in a block 803 in FIG. 8, performs code block segmentation on the UCI payload a including part or all of the HARQ-ACK information, the scheduling request, and the CSI, and adds a CRC bit to each code block segmented information bit (also referred to as a code block). The terminal apparatus 1 determines the minimum number of PRBs of the PUCCH resource that is configured by the higher layer parameter such that a coding rate of a codeword obtained by coding the UCI payload a including at least some or all of the HARQ-ACK information, the scheduling request, and the CSI and the CRC bits for the UCI payload a is equal to or lower than a coding rate given by a higher layer parameter PUCCH-F3-maximum-coderate. The minimum number of PRBs is given based on at least the number of bits of the UCI payload a, the number of CRC bits for the UCI payload a, the number of subcarriers per 1 PRB, the number of bits corresponding to the modulation scheme, and/or the maximum coding rate. The number of bits corresponding to the modulation scheme may be 1 in a case of pi/2-BPSK. The number of bits corresponding to the modulation scheme may be 2 in a case of QPSK.

The codeword may be a sequence including at least coded bits of the UCI. The codeword may be a sequence mapped to a PRB. The codeword may be a sequence given based on at least coupling of the one or multiple rate matching output sequences. One or multiple rate matching output sequences $f^c_e$ may be given based on at least a rate matching processing of a coded sequence $d^c_n$ of the UCI. Here, c is an index indicating a code block number. c is an index indicating a value from 0 to C−1. C represents the number of code blocks. e represents any integer ranging from 0 to $E_{UCI}$−1. $E_{UCI}$ represents a size of the rate matching output sequence $f^c_e$. n represents any integer ranging from 0 to N−1. N may be the number of coded bits of the UCI in the c-th code block. N represents a size of the coded sequence $d^c_n$ of the UCI. Input of the rate matching processing may be the coded sequence $d^c_n$ of the UCI.

The rate matching output sequence $f^c_e$ may be $f^c_e = d^c_{mod(n,N)}$. Here, mod (X, Y) may be a function of outputting the remainder of X divided by Y. At least in a case that a polar code is used for channel coding and $E_{UCI}$ is N or larger, the rate matching output sequence $f^c_e$ may be $f^c_e = d^c_{mod(n, N)}$. The coded sequence $d^c_n$ of the UCI may be given by interleaving the coded sequence that is channel-coded.

The number C of code blocks is given based on the code block segmentation. Details of the code block segmentation are described below.

In a case that the number C of code blocks is one, the code block may not be coupled.

The UCI payload a may be given based on at least the HARQ-ACK information, the scheduling request (SR), and the CSI. A payload including the UCI payload a and the CRC bits added to the UCI payload a is referred to as a total payload. A size A of the UCI payload a and a size $O_{CRC}$ of the CRC bits corresponding to the UCI payload a are referred to as a size of the total payload.

The length $E_{UCI}$ of the rate matching output sequence given by Equation 1 is given based on at least the size A of the UCI payload a including part or all of the HARQ-ACK information, the scheduling request, and the CSI, the size $O_{CRC}$ of the CRC bits for the UCI payload a, the maximum coding rate $R_{UCI}^{max}$, and the number $Q_m$ of bits corresponding to the modulation scheme. Here, ceil[F] is a function to round up a numerical value F and output an integer that is larger than and the closest to F. min(F1, F2) is a function to output a smaller value of F1 and F2. $E_{tot}$ is given based on at least Equation 2.

$$E_{UCI} = \min(E_{tot}, \text{ceil}[(A+O_{CRC})/R_{UCI}^{max}/Q_m] \cdot Q_m) \quad \text{Equation 1}$$

$$E_{tot} = M_{RB,min}^{PUCCH} \cdot N_{sc,ctrl}^{RB} \cdot N_{symb-UCI}^{PUCCH} \cdot Q_m \quad \text{Equation 2}$$

The terminal apparatus 1 determines the number $M_{RB,min}^{PUCCH}$ of PRBs of the PUCCH resource based on at least $N_{sc,ctrl}^{RB}$, $N_{symb-UCI}^{PUCCH}$, and $Q_m$. $N_{sc,ctrl}^{RB}$ may be given by a PUCCH format. $N_{sc,ctrl}^{RB}$ may represent the number of subcarriers given to one PRB. $N_{sc,ctrl}^{RB}$ may represent the number of subcarriers excluding the subcarriers given by the DMRS. $N_{sc,ctrl}^{RB}$ may represent the number of subcarriers which are included in one PRB in the frequency domain and to which the DMRS is mapped. $Q_m$ may be on a modulation order. $Q_m$ may represent the number depending on the modulation scheme. $Q_m$ may represent the number of bits that can be transmitted in one modulation symbol. $Q_m$ may be 1 in a case of pi/2-BPSK. $Q_m$ may be 2 in a case of QPSK. The maximum coding rate $R_{UCI}^{max}$ is a coding rate given by the higher layer parameter. In the case of PUCCH format 2, the maximum coding rate $R_{UCI}^{max}$ is given by the higher layer parameter PUCCH-F2-maximumcoderate. In the case of PUCCH format 3, the maximum coding rate $R_{UCI}^{max}$ is given by the higher layer parameter PUCCH-F3-maximum-coderate. In the case of PUCCH format 4, the maximum coding rate $R_{UCI}^{max}$ is given by the higher layer parameter PUCCH-F4-maximum-coderate. $N_{symb-UCI}^{PUCCH}$ represents the number of OFDM symbols used in transmission in PUCCH format 2 and/or PUCCH format 3 and/or PUCCH format 4. In PUCCH format 2, $N_{symb-UCI}^{PUCCH}$ may be given by higher layer parameter PUCCH-F0-F2-number-of-symbols. In PUCCH format 3 and/or PUCCH format 4, $N_{symb-UCI}^{PUCCH}$ represents the number of OFDM symbols excluding the number of OFDM symbols used to transmit the DMRS, and may be determined by the higher layer parameter PUCCH-F1-F3-F4-number-of-symbols.

A method for determining the number $M_{RB,min}^{PUCCH}$ of PRBs of the PUCCH resource is described. In a case that the terminal apparatus 1 transmits the UCI payload a having the size A and the CRC bits having the size $O_{CRC}$ added to the UCI payload a using PUCCH format 2 and/or PUCCH format 3 in the number $M_{RB,}^{PUCCH}$ of PRBs included in the PUCCH resource, the terminal apparatus 1 determines the minimum number $M_{RB,min}^{PUCCH}$ of PRBs used for the PUCCH transmission. Here, in the case of PUCCH format 2, $M_{RB}^{PUCCH}$ may be given by the higher layer parameter PUCCH-F2-number-of-PRBs. In the case of PUCCH format 3, $M_{RB,}^{PUCCH}$ may be given by the higher layer parameter PUCCH-F3-number-of-PRBs. $M_{RB,min}^{PUCCH}$ may represent a value equal to or smaller than $M_{RB,}^{PUCCH}$. In a case that $M_{RB,}^{PUCCH}$ is 1, the terminal apparatus 1 determines the minimum number $M_{RB,min}^{PUCCH}$ of PRBs satisfying an inequality of Expression 3. In a case that $M_{RB,}^{PUCCH}$ is larger than 1, the terminal apparatus 1 determines the minimum number $M_{RB,min}^{PUCCH}$ of PRBs simultaneously satisfying the inequality of Expression 3 and/or an inequality of Expression 4. In a case that an inequality of Expression 5 is satisfied, the terminal apparatus 1 transmits the PUCCH in the number $M_{RB,}^{PUCCH}$ of PRBs. Here, the maximum coding rate r may be $R_{UCI}^{max}$.

In a case that inequality of Expression 5 is satisfied, and the divided CSI reports, that is, CSI-part 1 and/or CSI-part 2 are included in the UCI payload a, the terminal apparatus 1 may perform the dropping of the UCI payload a in order from CSI-part 2 to CSI-part 1.

$$(A+O_{CRC}) \leq M_{RB,min}^{PUCCH} \cdot N_{sc,ctrl}^{RB} \cdot N_{symb-UCI}^{PUCCH} \cdot Q_m \cdot r \quad \text{Expression 3}$$

$$(A+O_{CRC}) > (M_{RB,min}^{PUCCH}-1) \cdot N_{sc,ctrl}^{RB} \cdot N_{symb-UCI}^{PUCCH} \cdot Q_m \cdot r \quad \text{Expression 4}$$

$$(A+O_{CRC}) > M_{RB}^{PUCCH} \cdot N_{sc,ctrl}^{PUCCH} \cdot N_{symb-UCI}^{PUCCH} \cdot Q_m \cdot r \quad \text{Expression 5}$$

In a case that the size A of the UCI payload a is smaller than 12, CRC bits having a size L1 are added to the UCI payload a. In a case that the size A of the UCI payload a is equal to or larger than 12 and is equal to or smaller than 19, CRC bits having a size L2 are added to the UCI payload a. In a case that the size A of the UCI payload a is equal to or larger than 20, CRC bits having a size L3 are added to the UCI payload a. In a case that the size A of the UCI payload a is equal to or larger than 360 and the length $E_{UCI}$ of the rate matching output sequence is equal to or larger than 1088, that is, in a case that the code block segmentation is performed, the terminal apparatus 1 adds CRC bits having a size L4 to the UCI payload a. Here, L1 may be 0. L2 may be 6. L3 may be 11. L4 may be 22.

Figure 7:
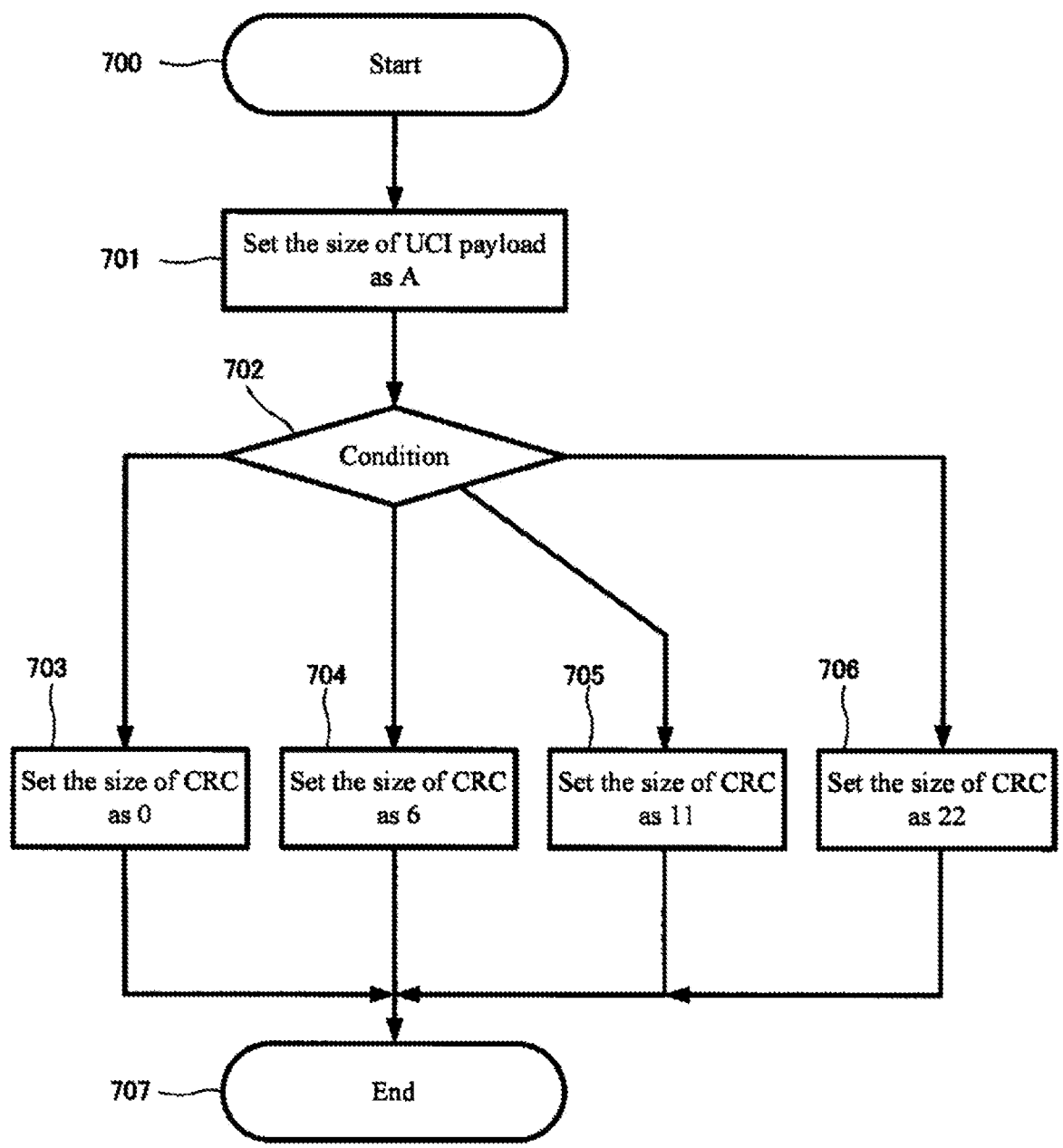
FIG. 7 is a diagram illustrating a flowchart for determining a size of CRC bits according to the present embodiment.

FIG. 7 is a diagram illustrating a flowchart for determining the size of the CRC bits according to the present embodiment. In (701), the terminal apparatus 1 sets the size of the UCI payload a to A. In (702), the terminal apparatus 1 determines the size of the CRC bits added to the UCI payload a based on the size A of the UCI payload a and $E_{u}ci$ given by Equation 1. Here, for example, in a case that A is smaller than 12, the process proceeds to (703). For example, in a case that A is equal to or larger than 12 and equal to or smaller than 19, the process proceeds to (704). For example, in a case that A is equal to or larger than 20 and smaller than 360, the process proceeds to (705). For example, in a case that A is equal to or larger than 360 and $E_{UCI}$ is equal to or larger than 1088, the process proceeds to (706). In other words, in a case that A and/or $E_{UCI}$ each satisfy a prescribed condition, the process proceeds to any one of (703) to (706).

(703) The terminal apparatus 1 sets the size of the CRC bits added to the UCI payload to 0.

(704) The terminal apparatus 1 sets the size of the CRC bits added to the UCI payload to 6.

(705) The terminal apparatus 1 sets the size of the CRC bits added to the UCI payload to 11. Note that the value of $E_{UCI}$ may be smaller than 1088.

(706) The terminal apparatus 1 sets the size of the CRC bits added to the UCI payload to 22.

Note that in (703) and/or (704), the terminal apparatus 1 may not consider the value of $E_{UCI}$ given by Equation 1.

Note that in (705) and (706), the value of $E_{UCI}$ may be given by Equation 1.

FIG. 8 is a diagram illustrating the code block segmentation based on the size A of the UCI payload a and the size of the rate matching output sequence $f^c_e$ according to the present embodiment. In 806, whether the divided CSI is included in the UCI payload a is determined.

Dropping means removal of data from the transmission data in accordance with a dropping rule. The data removed from the transmission data, that is, the dropped data, may not be transmitted. The transmission data may be the UCI payload a, or may be the total payload. The dropping rule may be a rule based on a priority level. CSI-part 1 report including $N_{CSI-part1}^{reported}$ reports may be a total sum of CSI-part 1, n. Here, n may be n={1, 2, ..., $N_{CSI-part1}^{reported}$}. A smaller value of n may mean a higher priority level. In other words, in a case of dropping CSI-part 1 report including $N_{CSI-part1}^{reported}$ reports, the terminal apparatus 1 may apply the dropping first to CSI-part 1, $N_{CSI-part1}^{reported}$, and next, apply the dropping first to CSI-part 1, $N_{CSI-part1}^{reported}-1$. CSI-part 2 report including $N_{CSI-part2}^{reported}$ reports may be a total sum of CSI-part 2, n. Here, n may be n={1, 2, ..., $N_{CSI-part\ 2}^{reported}$}. A smaller value of n may mean a higher priority level. In other words, in a case of dropping CSI-part 2 report including $N_{CSI-part2}^{reported}$ reports, the terminal apparatus 1 may apply the dropping first to CSI-part 2, $N_{CSI-part2}^{reported}$, and next, apply the dropping first to CSI-part 2, $N_{CSI-part2}^{reported}-1$. The dropping of the UCI payload a may be performed in order from CSI-part 2 to CSI-part 1.

(801) The terminal apparatus 1 determines in 801 whether to perform the code block segmentation based on at least the size A of the UCI payload a, a threshold $K_1$ for the size A of the UCI payload a, the size $E_{UCI}$ of the rate matching output sequence $f^c_e$ of the total payload, and a threshold $E_1$ for the size $E_{UCI}$ of the rate matching output sequence $f^c_e$. Note that the size of the CRC bits added to the UCI payload a may be determined based on at least the size of the UCI payload.

(804) In a case that the size A of the UCI payload a is equal to or larger than $K_1$ and the size $E_{UCI}$ of the rate matching output sequence $f^c_e$ is equal to or larger than $E_1$, the terminal apparatus 1 can divide the UCI payload a into two (the number C of code blocks is C=2) in block 803. Here, $K_1$ may be 360. $E_1$ may be 1088. The rate matching output sequence Fe is given based on at least the channel coding and the rate matching processing of the total payload including at least the UCI payload a.

(805) In a case that the size A of the UCI payload a is at least smaller than $K_1$ or the size $E_{UCI}$ of the rate matching output sequence $f^c_e$ is at least smaller than $E_1$, the CRC bits are added to the UCI payload a to perform the channel coding in block 802. Specifically, in the case that the size A of the UCI payload a is at least smaller than $K_1$ or the size $E_{UCI}$ of the rate matching output sequence $f^c_e$ is at least smaller than $E_1$, the code block segmentation may not be performed on the total payload (or the number C of code blocks C may be C=1). The total payload may be a payload obtained by adding the CRC bits to the UCI payload a.

(806) In a case that the UCI payload a includes the divided CSI, and Expression 5 is satisfied, the process proceeds to 807.

(807) The dropping is applied to CSI-part 2 until an inequality expressed in Expression 5A and an inequality expressed in Expression 5B are satisfied. The terminal apparatus 1 performs transmission using PUCCH format 3 at the same time with $N_{CSI\text{-}part\,2}^{reported}$ CSI-part 2 reports selected by applying the dropping to the UCI payload in accordance with the priority level, the HARQ-ACK information and/or the scheduling request and/or $N_{CSI}^{total}$ CSI-part 1. The terminal apparatus 1 performs transmission using PUCCH format 4 at the same time with $N_{CSI\text{-}part\,2}^{reported}$ CSI-part 2 reports selected by applying the dropping to the UCI payload in accordance with the priority level, the HARQ-ACK information and/or the scheduling request and/or $N_{CSI}^{total}$ CSI-part 1 reports. Here, $O_{CSI\text{-}part\,1,\,n}$ may represent the number of bits of the n-th CSI-part 1 report. $O_{CSI\text{-}part2,\,n}$ may represent the number of bits of CSI-part 2 report in accordance with the n-th priority level. $O_{CRC,\,CSI\text{-}part\,1}$ may represent the number of CRC bits for a total sum $D_N$ of $O_{CSI\text{-}part\,1,\,n}$. The total sum $D_N$ of $O_{CSI\text{-}part\,1,\,n}$ may be a value equal to or smaller than $O_{CSI\text{-}part\,1}$. $O_{CRC}$, CSI-part 2 may represent the number of CRC bits for a total sum $B_N$ of $O_{CSI\text{-}part\,2,\,n}$. The total sum $B_N$ of $O_{CSI\text{-}part\,2,\,n}$ may be a value equal to or smaller than $O_{CSI\text{-}part\,2}$. A relationship of $O_{CRC,\,CSI\text{-}part\,1} + O_{CRC,\,CSI\text{-}part\,1} = O_{CRC}$ may be established. $O_{ACK}$ may represent the number of bits of the HARQ-ACK information. $O_{SR}$ may represent the number of bits of the scheduling request.

(808) Whether or not the UCI payload having CSI-part 2 to which the dropping is applied satisfies the inequality expressed by Expression 5A and the inequality expressed by Expression 5B is determined. In a case that the inequality expressed by Expression 5A and the inequality expressed by Expression 5B are satisfied, the process proceeds to 801. In a case that the inequality expressed by Expression 5A and the inequality expressed by Expression 5B are not satisfied, the process proceeds to 809. Here, $B_N$ is given by Equation 5C. $B_{N+1}$ is given by Equation 5D. $W_M$ is given by Equation 5E.

$$B_N + O_{CRC,CSI\text{-}part2} \leq W_M \quad \text{Expression 5A}$$

$$B_{N+1} + O_{CRC,CSI\text{-}part2} > W_M \quad \text{Expression 5B}$$

$$B_N = \sum_{n=1}^{N_{CSI\text{-}part2}^{reported}} O_{CSI\text{-}part2,n} \quad \text{Equation 5C}$$

$$B_{N+1} = \sum_{n=1}^{N_{CSI\text{-}part2}^{reported}+1} O_{CSI\text{-}part2,n} \quad \text{Equation 5D}$$

$$W_M = \left( M_{RB}^{PUCCH} \cdot N_{sc,ctrl}^{RB} \cdot N_{symb\text{-}UCI}^{PUCCH} - \left\lceil \left( O_{ACK} + O_{SR} + \sum_{n=1}^{N_{CSI}^{total}} O_{CSI\text{-}part1,n} + O_{CRC,CSI\text{-}part1} \right) \middle/ (Qm \cdot r) \right\rceil \right) \cdot Qm \cdot r \quad \text{Equation 5E}$$

(809) The dropping is applied to CSI-part 1 until an inequality expressed in Expression 5F and an inequality expressed in Expression 5G are satisfied. The terminal apparatus 1 performs transmission using PUCCH format 3 at the same time with $N_{CSI}^{total}$ CSI-part 1 reports selected by applying the dropping to the UCI payload in accordance with the priority level, the HARQ-ACK information and/or the scheduling request. The terminal apparatus 1 performs transmission using PUCCH format 4 at the same time with $N_{CSI}^{total}$ CSI-part 1 reports selected by applying the dropping to the UCI payload in accordance with the priority level, the HARQ-ACK information and/or the scheduling request. Here, $D_N$ is given by Equation 5H. $D_{N+1}$ is given by Equation 5I. $V_M$ is given by Equation 5J.

$$D_N + O_{CRC,CSI\text{-}part1} \leq V_M \quad \text{Expression 5F}$$

$$D_{N+1} + O_{CRC,CSI\text{-}part1} > V_M \quad \text{Expression 5G}$$

$$D_N = O_{ACK} + O_{SR} + \sum_{n=1}^{N_{CSI\text{-}part1}^{reported}} O_{CSI\text{-}part1,n} \quad \text{Equation 5H}$$

$$D_{N+1} = O_{ACK} + O_{SR} + \sum_{n=1}^{N_{CSI\text{-}part1}^{reported}+1} O_{CSI\text{-}part1,n} \quad \text{Equation 5I}$$

$$V_M = M_{RB}^{PUCCH} \cdot N_{sc,ctrl}^{RB} \cdot N_{symb\text{-}UCI}^{PUCCH} \cdot Qm \cdot r \quad \text{Equation 5J}$$

As illustrated in FIG. 8, regarding the size $E_{UCI}$ of the rate matching output sequence of the total payload, which is the decision criteria for execution of the code block segmentation, a problem occurs of recursively referencing the size of the CRC bits that varies depending on whether or not the code block segmentation is applied (also referred to as a "chicken-and-egg problem"). Furthermore, a total sum of $O_{CSI\text{-}part\,2,\,n}$ satisfying Expression 5A and Expression 5B, that is, the number $B_N$ of bits of CSI-part 2 reports subjected to the dropping is reduced every time in applying the dropping. For example, in a case that $B_{N+1}$ is larger than 20 bits and $B_N$ is smaller than 20 bits, there is a problem that $O_{CRC,\,CSI\text{-}part\,2}$ varies. Furthermore, a total sum of $O_{CSI\text{-}part\,1,\,n}$ satisfying Expression 5F and Expression 5G, that is, the number $D_N$ of bits of CSI-part 2 reports subjected to the dropping is reduced every time in subjecting the dropping. For example, in a case that $D_{N+1}$ is larger than 20 bits and $D_N$ is smaller than 20 bits, there is a problem that $O_{CRC,\,CSI\text{-}part\,1}$ varies.

The CRC added to the UCI payload is referred to as CRC bits. Temporary CRC bits referenced to select the number $M_{RB,\ min}^{PUCCH}$ of PRBs of the PUCCH resource is referred to as virtual CRC bits. A size of the CRC bits referenced to select the number $M_{RB,\ min}^{PUCCH}$ of PRBs of the PUCCH resource is referred to as a size of the temporary CRC bits or a size of the virtual CRC bits. The size of the virtual CRC bits may be the same as or different from the size of the CRC bits added to the UCI payload. The UCI payload may be the same as the UCI payload a.

The size of the virtual CRC bits may be the number $O_{CRC,\ N+1}$ in 905 and/or the number $O_{CRC,\ N}$ in 906. The number $O_{CRC,\ N+1}$ in 905 and/or the number $O_{CRC,\ N}$ in 906 used to select the number $M_{RB,\ min}^{PUCCH}$ of PRBs the PUCCH resource may be given by the size of the virtual CRC bits.

The size of the virtual CRC bits may be given based on at least the size of the UCI payload a. The size of the virtual CRC bits may be given based on at least the number of bits of the HARQ-ACK information. The size of the virtual CRC bits may be given based on at least the number of bits of the scheduling request. The size of the virtual CRC bits may be given based on at least the number of bits of the CSI. The size of the virtual CRC bits may be given based on at least a total sum of a combination of any of the number of bits of the HARQ-ACK information, the number of bits of the scheduling request, and the number of bits of CSI. The size of the virtual CRC bits may be given regardless of the size of the UCI payload a. Here, the size of the CRC bits added to the UCI payload a may be given based on at least the size of the UCI payload a. The size of the virtual CRC bits may be a prescribed value regardless of the size of the UCI payload a. For example, the prescribed value may be "0". The prescribed value may be 6. The prescribed value may be "11".

Figure 10:
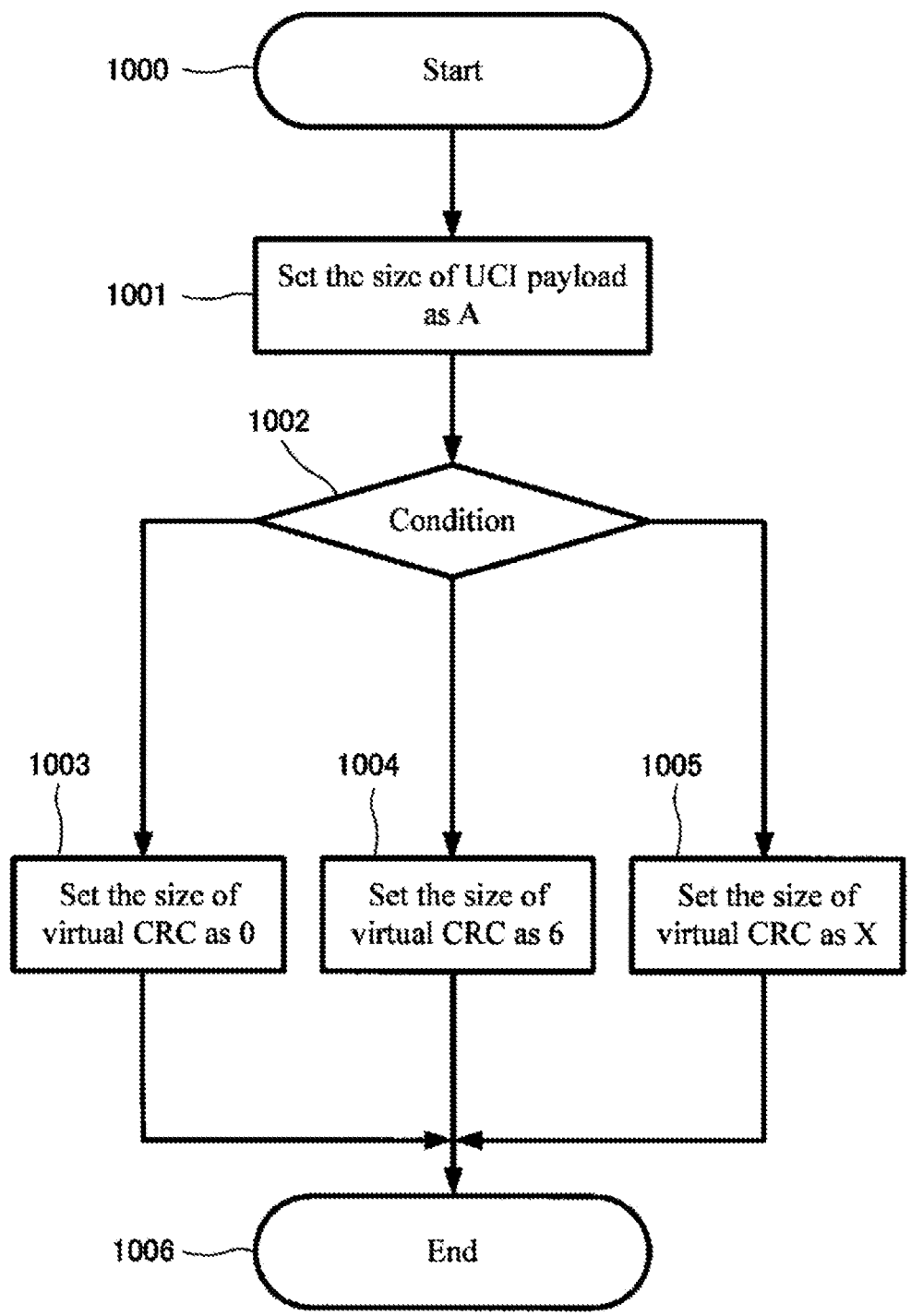
FIG. 10 is a diagram illustrating a flowchart for determining a size of virtual CRC bits according to the present embodiment.

FIG. 10 is a diagram illustrating a flowchart for determining the size of the virtual CRC bits according to the present embodiment. In (1001), the terminal apparatus 1 sets the size of the UCI payload to A. In (1002), the terminal apparatus 1 determines the size of the virtual CRC bits based on at least the size A of the UCI payload. Here, in a case that A is smaller than Y1, the process proceeds to (1003). In a case that A is equal to or larger than Y1 and smaller than Y2, the process proceeds to (1004). In a case that A is equal to or larger than Y2, the process proceeds to (1005). Here, Y1 may be 12. Y2 may be 20. For example, each of Y1 and Y2 may be a value satisfying Y1<Y2.

(1003) The terminal apparatus 1 configures the size of the virtual CRC bits to 0.

(1004) The terminal apparatus 1 configures the size of the virtual CRC bits to 6.

(1005) The terminal apparatus 1 configures the size of the virtual CRC bits to X.

Here, X may be X1. In a case that A is smaller than Y3, X may be X1, and in a case that A is equal to or larger than Y3, X may be X2. Here, Y3 may be 360. X1 may be 11 or 22. X2 may be 22. For example, as for X1 and X2, X1 may be a value equal to or smaller than X2.

The "configuring the size of the virtual CRC bits to X1" may be "configuring the size of the CRC bits referenced to select the number $M_{RB,\ min}^{PUCCH}$ of PRBs of the PUCCH resource, assuming that the code block segmentation is not performed on the UCI payload a including part or all of the HARQ-ACK information, the scheduling request, and the CSI." In other words, in the case of configuring the size of the CRC bits referenced to select the number $M_{RB,\ min}^{PUCCH}$ of PRBs of s the PUCCH resource, the terminal apparatus 1 may assume that the code block segmentation is not performed on the UCI payload a including part or all of the HARQ-ACK information, the scheduling request, and the CSI. Even in a case that the terminal apparatus 1 assumes that the code block segmentation is not performed on the UCI payload a including part or all of the HARQ-ACK information, the scheduling request, and the CSI in the case of configuring the size of the CRC bits referenced to select the number $M_{RB,\ min}^{PUCCH}$ of PRBs of the PUCCH resource, the code block segmentation may be performed on the UCI payload a including part or all of the HARQ-ACK information, the scheduling request, and the CSI, and the size of the CRC bits may be determined based on that the code block segmentation is performed on the UCI payload a including part or all of the HARQ-ACK information, the scheduling request, and the CSI.

The "configuring the size of the virtual CRC bits to X2" may be "configuring the size of the CRC bits referenced to select the number $M_{RB,\ min}^{PUCCH}$ of PRBs of the PUCCH resource, assuming that the code block segmentation is performed on the UCI payload a including part or all of the HARQ-ACK information, the scheduling request, and the CSI." In other words, in the case of configuring the size of the CRC bits referenced to select the number $M_{RB,\ min}^{PUCCH}$ of PRBs of the PUCCH resource, the terminal apparatus 1 may assume that the code block segmentation is performed on the UCI payload a including part or all of the HARQ-ACK information, the scheduling request, and the CSI. Even in a case that the terminal apparatus 1 assumes that the code block segmentation is performed on the UCI payload a including part or all of the HARQ-ACK information, the scheduling request, and the CSI in the case of configuring the size of the CRC bits referenced to select the number $M_{RB,\ min}^{PUCCH}$ of PRBs of the PUCCH resource, the code block segmentation may not be performed on the UCI payload a including part or all of the HARQ-ACK information, the scheduling request, and the CSI, and the size of the CRC bits may be determined based on that the code block segmentation is not performed on the UCI payload a including part or all of the HARQ-ACK information, the scheduling request, and the CSI.

In the case that A is smaller than Y3, the size of the virtual CRC bits may be the same as the size of the CRC bits added to the UCI payload. In the case that A is smaller than Y3, the size of the virtual CRC bits and the size of the CRC bits added to the UCI payload are given based on A.

In a case that A is equal to or larger than Y3, the size of the virtual CRC bits may be the same as or different from the size of the CRC bits added to the UCI payload. In the case that A is equal to or larger than Y3, the size of the virtual CRC bits is given based on A, and the size of the CRC bits added to the UCI payload is given based on A and $E_{UCI}$.

The size of the virtual CRC bits may be given regardless of the size $E_{UCI}$ of the rate matching output sequence $f^e_e$.

The number $M_{RB,\ min}^{PUCCH}$ of PRBs of the PUCCH resource is given based on at least the size of the virtual CRC bits given based on the size of the UCI payload. In the present embodiment, the size of the CRC bits may be the number of CRC bits.

A description is given of a method for determining, by the terminal apparatus 1, the size of the CRC bits added to the UCI payload in the case of applying the dropping to CSI-part 2 included in the UCI payload a. The terminal apparatus 1 sets the number of PRBs of the PUCCH resource to $M_{RB}^{PUCCH}$. Here, $M_{RB}^{PUCCH}$ may be the number of PRBs indicated by the higher layer parameter PUCCH-F2-number-of-PRBs or PUCCH-F3-number-of-PRBs for PUCCH transmission. For PUCCH format 2, $M_{RB}^{PUCCH}$ may be the number of PRBs indicated by the higher layer parameter PUCCH-F2-number-of-PRBs for PUCCH transmission. For PUCCH format 3, $M_{RB}^{PUCCH}$ may be the number of PRBs indicated by the higher layer parameter PUCCH-F3-number-of-PRBs for PUCCH transmission. In the case of applying the dropping to CSI-part 2, the terminal apparatus 1 sets the number $B_N$ of bits of CSI-part 2 and the number $O_{CRC,N}$ of CRC bits for $B_N$ in an inequality expressed in Expression 6A and sets the number $B_{N+1}$ of bits of CSI-part 2 and the number $O_{CRC, N+1}$ of CRC bits for $B_{N+1}$ in an inequality expressed in Expression 6B, and performs the dropping until the inequality expressed in Expression 6A and the inequality expressed in Expression 6B are simultaneously satisfied to determine $B_N$. Here, $B_N$ may be the number of bits of the CSI part 2 of the first to $N_{CSI\text{-}part2}^{reported}$-th priority levels. $B_{N+1}$ may be the number of bits of the CSI part 2 of the first to $N_{CSI\text{-}part\ 2}^{reported}+1$-th priority levels.

$$B_N + O_{CRC,N} \le W_M \quad \text{Expression 6A}$$

$$B_{N+1} + O_{CRC,N+1} > W_M \quad \text{Expression 6B}$$

Figure 9:
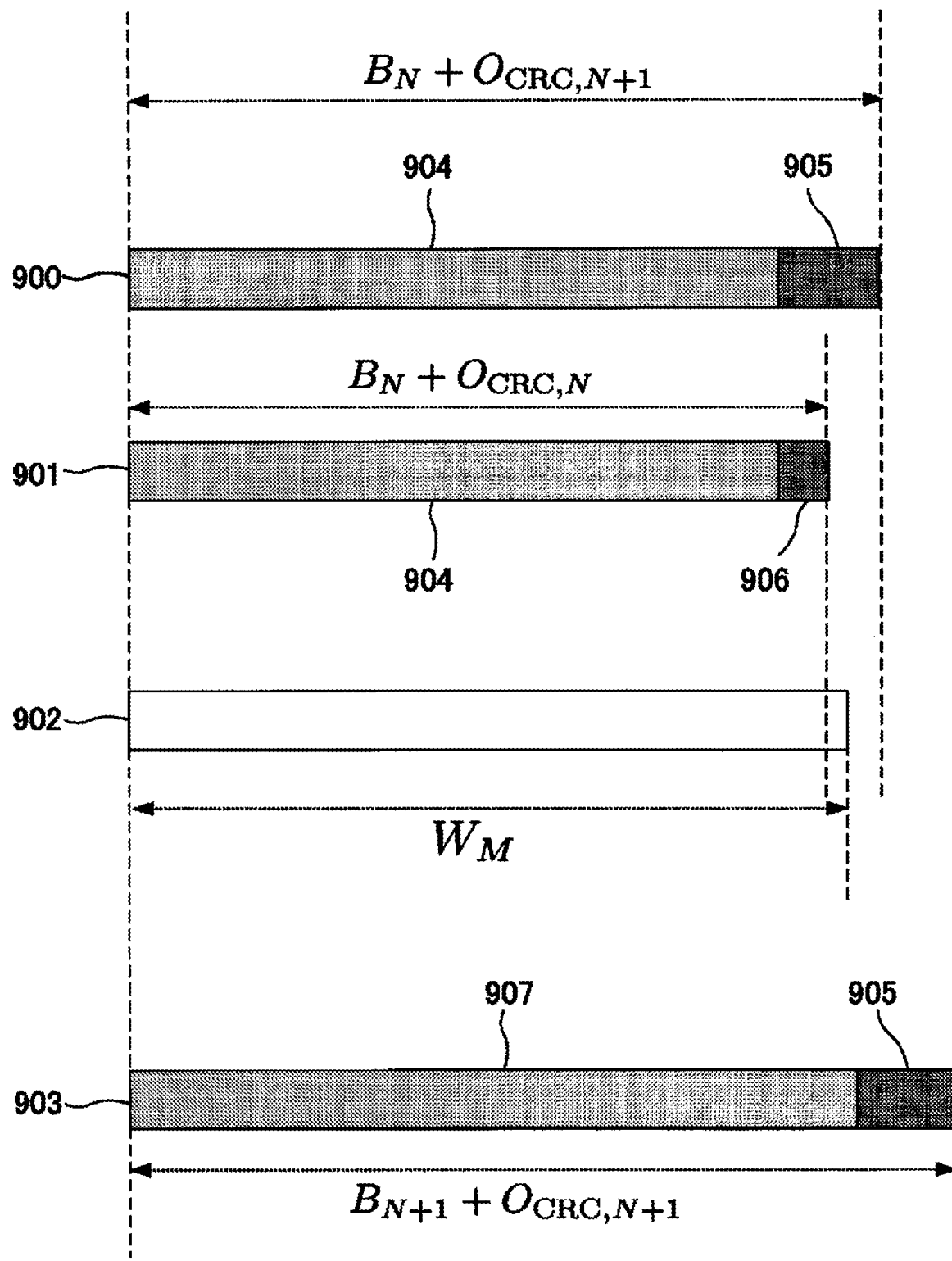
FIG. 9 is a diagram illustrating an example of a method for determining a size of CRC bits added to a UCI payload in a case that dropping is applied to CSI-part 2 included in the UCI payload a according to the present embodiment.

FIG. 9 is a diagram illustrating an example of the method for determining the size of the CRC bits added to the UCI payload in a case that the dropping is applied to CSI-part 2 included in the UCI payload a according to the present embodiment. 903 corresponds to the number $B_{N+1}$ of bits of the CSI part 2 of the first to $N_{CSI\text{-}part\ 2}^{reported}+1$-th priority levels and the number $O_{CRC,N+1}$ of CRC bits for $B_{N+1}$ obtained by setting the number of PRBs of the PUCCH resource to $M_{RB}^{PUCCH}$ and applying the dropping. 903 may include 907 and 905. 907 may correspond to the number $B_{N+1}$ of bits of the CSI part 2 of the first to $N_{CSI\text{-}part2}^{reported}+1$-th priority levels. 905 corresponds to CRC bits added to 907. The number $O_{CRC,N+1}$ (the number of bits, the bit size, the size) corresponding to 905 may be given assuming that the dropping is applied or not applied. The number $O_{CRC,N+1}$ corresponding to 905 may be determined based on $E_{UCI}$ given by Equation 1. Here, $E_{UCI}$ used to calculate the number $O_{CRC,N+1}$ of CRC bits 905 added to 907 may be different from actual $E_{UCI}$. That is, the number $O_{CRC,N+1}$ of CRC bits 905 added to 907 may be calculated based on a value of virtual $E_{UCI}$. In other words, the number of CRC bits 905 may be the same as or different from the actual number of CRC bits. The number $O_{CRC,N+1}$ of CRC bits 905 added to 907 may be determined based on the flowchart in FIG. 7 depending on $E_{UCI}$ given by Equation 1. The number $O_{CRC,N+1}$ of CRC bits 905 added to 907 may be determined based on the flowchart in FIG. 10 depending on virtual $E_{UCI}$ given by Equation 1.

In FIG. 9, the number $O_{CRC,N+1}$ of CRC bits 905 added to 907 may be given by assuming the number of PRBs indicated by PUCCH-F2-number-of-PRBs or PUCCH-F3-number-of-PRBs. The number $O_{CRC,N+1}$ of CRC bits 905 added to 907 may be given based on a first higher layer parameter.

In FIG. 9, 901 corresponds to the number $B_N$ of bits of the CSI part 2 of the first to $N_{CSI\text{-}part\ 2}^{reported}$-th priority levels and the number $O_{CRC,N}$ of CRC bits for $B_N$ obtained by setting the number of PRBs of the PUCCH resource to $M_{RB}^{PUCCH}$ and applying the dropping. 901 may include 904 and 906. 904 may correspond to the number $B_N$ of bits of the CSI part 2 of the first to $N_{CSI\text{-}part\ 2}^{reported}$-th priority levels. 906 corresponds to CRC bits added to 907. The number $O_{CRC,N}$ (the number of bits, the bit size, the size) corresponding to 906 may be given assuming that the dropping is applied. The number $O_{CRC,N}$ corresponding to 906 may be determined based on $E_{UCI}$ given by Equation 1. Here, $E_{UCI}$ used to calculate the number $O_{CRC,N}$ of CRC bits 906 added to 904 may be different from actual $E_{UCI}$. That is, the number $O_{CRC,N}$ of CRC bits 906 added to 904 may be calculated based on a value of virtual $E_{UCI}$. In other words, the number of CRC bits 906 may be the same as or different from the actual number of CRC bits. The number $O_{CRC,N}$ of CRC bits 906 added to 904 may be determined based on the flowchart in FIG. 7 depending on $E_{UCI}$ given by Equation 1. The number $O_{CRC,N}$ of CRC bits 906 added to 904 may be determined based on the flowchart in FIG. 10 depending on virtual $E_{UCI}$ given by Equation 1.

In FIG. 9, the number $O_{CRC,N+1}$ of CRC bits 906 added to 904 may be given by assuming the number of PRBs indicated by PUCCH-F2-number-of-PRBs or PUCCH-F3-number-of-PRBs. The number $O_{CRC,N+1}$ of CRC bits 907 added to 904 may be given based on a first higher layer parameter.

In FIG. 9, $W_M$ IN 902 is given by Equation 5E. As illustrated by the inequalities of Expression 6A and Expression 6B, the terminal apparatus 1 applies the dropping to CSI-part 2 included in the UCI payload a such that a total sum 901 of the number $B_N$ of bits of the CSI part 2 of the first to $N_{CSI\text{-}part\ 2}^{reported}$-th priority levels and the number $O_{CRC,N}$ of CRC bits for $B_N$ is equal to or smaller than $W_M$ given by Equation 5E, and a total sum 903 of the number $B_{N+1}$ of bits of the CSI part 2 of the first to $N_{CSI\text{-}part\ 2}^{reported}+1$-th priority levels and the number $O_{CRC,N+1}$ of CRC bits for $B_{N+1}$ is larger than $W_M$ given by Equation 5E, to determine the number $B_N$ of bits of the CSI part 2 of the first to $N_{CSI\text{-}part\ 2}^{reported}$-th priority levels and the number $O_{CRC,N}$ of CRC bits for $B_N$. In addition, the total sum 901 of the number $B_N$ of bits of the CSI part 2 of the first to $N_{CSI\text{-}part\ 2}^{reported}$-th priority levels and the number $O_{CRC,N}$ of CRC bits for $B_N$ being equal to or smaller than $W_M$ given by Equation 5E may mean that a coding rate RM of the total payload in the case of setting the number of PRBs of the PUCCH resource to $M_{RB}^{PUCCH}$ is equal to or smaller than a coding rate r. Here, the coding rate $R_M$ of the total payload may be given based on the number $M_{RB}^{PUCCH}$ of PRBs of the PUCCH resource.

A description is given of a method for determining, by the terminal apparatus 1, the size of the CRC bits added to the UCI payload in the case of applying the dropping to CSI-part 1 included in the UCI payload a. The terminal apparatus 1 sets the number of PRBs of the PUCCH resource to $M_{RB}^{PUCCH}$. Here, $M_{RB}^{PUCCH}$ may be the number of PRBs indicated by the higher layer parameter PUCCH-F2-number-of-PRBs or PUCCH-F3-number-of-PRBs for PUCCH transmission. For PUCCH format 2, $M_{RB}^{PUCCH}$ may be the number of PRBs indicated by the higher layer parameter PUCCH-F2-number-of-PRBs for PUCCH transmission. For PUCCH format 3, $M_{RB}^{PUCCH}$ may be the number of PRBs indicated by the higher layer parameter PUCCH-F3-number-of-PRBs for PUCCH transmission. In the case of applying the dropping to CSI-part 1, the terminal apparatus 1 sets the number $D_N$ of bits of CSI-part 1 and the number $O_{CRC,\ N}$ of CRC bits for $D_N$ in an inequality expressed in Expression 7A and sets the number $D_{N+1}$ of bits of CSI-part 1 and the number $O_{CRC,\ N+1}$ of CRC bits for $D_{N+1}$ in an inequality expressed in Expression 7B, and performs the dropping until the inequality expressed in Expression 7A and the inequality expressed in Expression 7B are simultaneously satisfied to determine $D_N$. Here, $D_N$ may be the number of bits of the CSI part 1 of the first to $N_{CSI\text{-}part\ 1}^{reported}$-th priority levels. $D_{N+1}$ may be the number of bits of the CSI part 1 of the first to $N_{CSI\text{-}part\ 1}^{reported}+1$-th priority levels.

$$D_N O_{CRC,N} \le V_M \quad \text{Expression 7A}$$

$$D_{N+1} + O_{CRC,N+1} > V_M \quad \text{Expression 7B}$$

Figure 11:
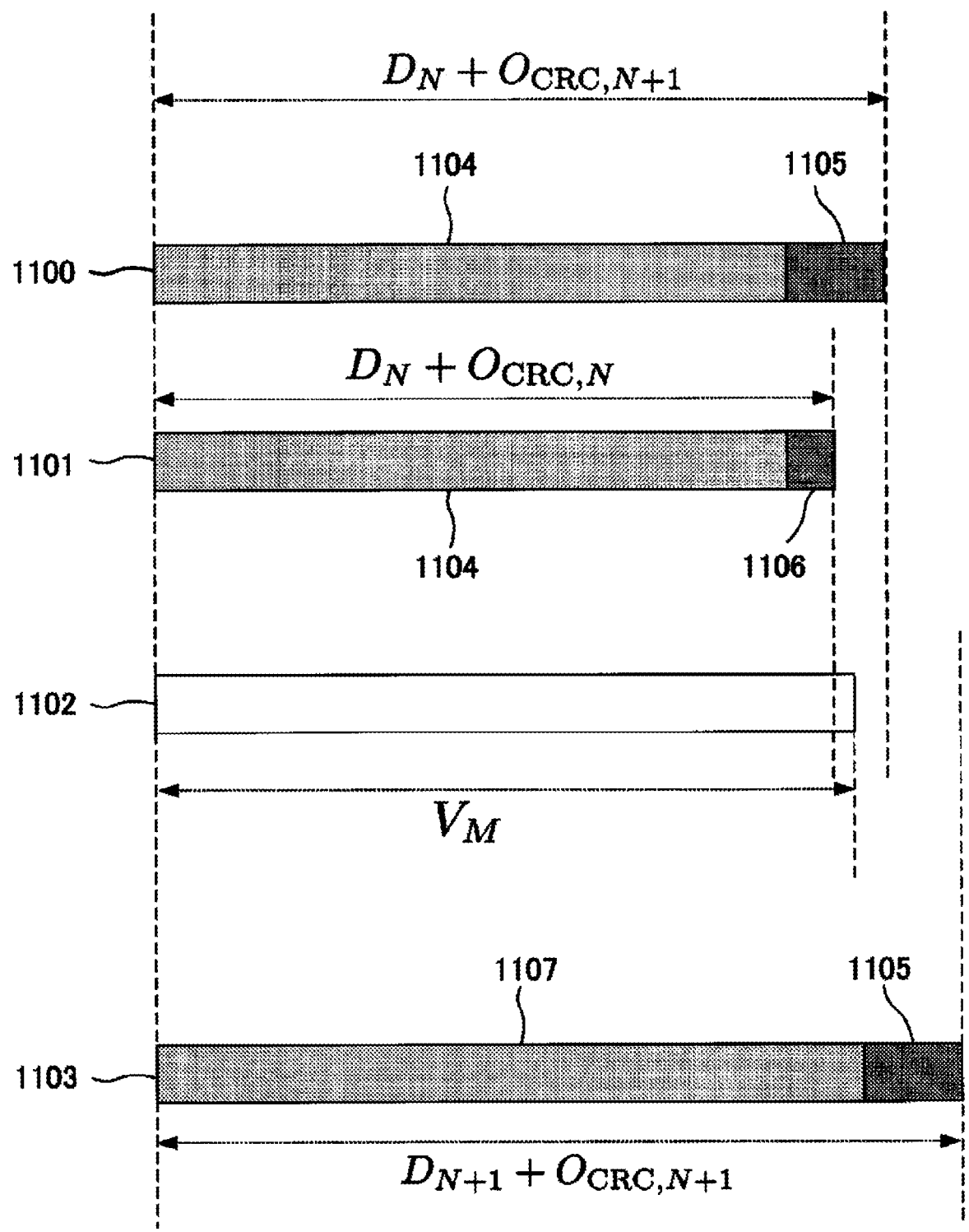
FIG. 11 is a diagram illustrating an example of a method for determining a size of CRC bits added to a UCI payload in a case that dropping is applied to CSI-part 1 included in the UCI payload a according to the present embodiment.

FIG. 11 is a diagram illustrating an example of the method for determining the size of the CRC bits added to the UCI payload in a case that the dropping is applied to CSI-part 1 included in the UCI payload a according to the present embodiment. 1103 corresponds to the number $D_{N+1}$ of bits of the CSI part 1 of the first to $N_{CSI\text{-}part\ 1}^{reported}+1$-th priority levels and the number $O_{CRC,N+1}$ of CRC bits for $D_{N+1}$ obtained by setting the number of PRBs of the PUCCH resource to $M_{RB}^{PUCCH}$ and applying the dropping. 1103 may include 1107 and 1105. 1107 may correspond to the number $D_{N+1}$ of bits of the CSI part 1 of the first to $N_{CSI\text{-}part\ 1}^{reported}+1$-th priority levels. 1105 corresponds to CRC bits added to 1107. The number $O_{CRC,N+1}$ (the number of bits, the bit size, the size) corresponding to 1105 may be given assuming that the dropping is applied or not applied. The number $O_{CRC,N+1}$ corresponding to 1105 may be determined based on $E_{UCI}$ given by Equation 1. Here, $E_{UCI}$ used to calculate the number $O_{CRC,N+1}$ of CRC bits 1105 added to 1107 may be different from actual $E_{UCI}$. That is, the number $O_{CRC,N+1}$ of CRC bits 1105 added to 1107 may be calculated based on a value of virtual $E_{UCI}$. In other words, the number of CRC bits 1105 may be the same as or different from the actual number of CRC bits. The number $O_{CRC,N+1}$ of CRC bits 1105 added to 1107 may be determined based on the flowchart in FIG. 7 depending on $E_{UCI}$ given by Equation 1. The number $O_{CRC,N+1}$ of CRC bits 1105 added to 1107 may be determined based on the flowchart in FIG. 10 depending on virtual $E_{UCI}$ given by Equation 1.

In FIG. 11, the number $O_{CRC,N+1}$ of CRC bits 1105 added to 1107 may be given by assuming the number of PRBs indicated by PUCCH-F2-number-of-PRBs or PUCCH-F3-number-of-PRBs. The number $O_{CRC,N+1}$ of CRC bits 1105 added to 1107 may be given based on the first higher layer parameter.

In FIG. 11, 1101 corresponds to the number $D_N$ of bits of the CSI, part 1 of the first to $N_{CSI\text{-}part1}^{reported}$-th priority levels and the number $O_{CRC,N}$ of CRC bits for $D_N$ obtained by setting the number of PRBs of the PUCCH resource to $M_{RB}^{PUCCH}$ and applying the dropping. 1101 may include 1104 and 1106, 1104 may correspond to the number $D_N$ of bits of the CSI part 1 of the first to $N_{CSI\text{-}part\ 1}^{reported}$-th priority levels. 1106 corresponds to CRC bits added to the section 1107. The number $O_{CRC,N}$ (the number of bits, the bit size, the size) corresponding to 1106 may be given assuming that the dropping is applied. The number $O_{CRC,N}$ corresponding to 1106 may be determined based on $E_{UCI}$ given by Equation 1. Here, $E_{UCI}$ used to calculate the number $O_{CRC,N}$ of CRC bits corresponding to 1106 added to 1104 may be different from actual $E_{UCI}$. That is, the number $O_{CRC,N}$ of CRC bits 1106 added to 1104 may be calculated based on a value of virtual $E_{UCI}$. In other words, the number of CRC bits 1106 may be the same as or different from the actual number of CRC bits. The number $O_{CRC,N}$ of CRC bits 1106 added to 1104 may be determined based on the flowchart in FIG. 7 depending on $E_{UCI}$ given by Equation 1. The number $O_{CRC,N}$ of CRC bits 1106 added to 1104 may be determined based on the flowchart in FIG. 10 depending on virtual $E_{UCI}$ given by Equation 1.

In FIG. 11, the number $O_{CRC,N+1}$ of CRC bits 1106 added to 1104 may be given by assuming the number of PRBs indicated by PUCCH-F2-number-of-PRBs or PUCCH-F3-number-of-PRBs. The number $O_{CRC,N+1}$ of CRC bits 1107 added to 1104 may be given based on the first higher layer parameter.

In FIG. 11, $V_m$ corresponding to a section denoted by 1102 is given by Equation 5J. As illustrated by the inequalities of Expression 7A and Expression 7B, the terminal apparatus 1 applies the dropping to CSI-part 1 included in the UCI payload a such that a total sum corresponding to the section 1101 of the number $D_N$ of bits of the CSI part 1 of the first to $N_{CSI\text{-}part\ 1}^{reported}$-th priority levels and the number $O_{CRC,N}$ of CRC bits for $D_N$ is equal to or smaller than $V_M$ given by Equation 5J, and a total sum corresponding to the section 1103 of the number $D_N+1$ of bits of the CSI part 1 of the first to $N_{CSI\text{-}part\ 1}^{reported}+1$-th priority levels and the number $O_{CRC,N+1}$ of CRC bits for $D_{N+1}$ is larger than $V_M$ given by Equation 5J, to determine the number $D_N$ of bits of the CSI part 1 of the first to $N_{CSI\text{-}part\ 1}^{reported}$-th priority levels and the number $O_{CRC,N}$ of CRC bits for $D_N$. In addition, the total sum corresponding to the section 1101 of the number $D_N$ of bits of the CSI part 1 of the first to $N_{CSI\text{-}part\ 1}^{reported}$-th priority levels and the number $O_{CRC,N}$ of CRC bits for $D_N$ being equal to or smaller than $V_M$ given by Equation 5J may mean that a coding rate RM of the total payload in the case of setting the number of PRBs of the PUCCH resource to $M_{RB}^{PUCCH}$ is equal to or smaller than a coding rate r. Here, the coding rate RM of the total payload may be given based on the number $M_{RB}^{PUCCH}$ of PRBs of the PUCCH resource.

Hereinafter, various aspects of the terminal apparatus 1 and the base station apparatus 3 according to the present embodiment will be described.

(1) A first aspect according to the present embodiment is a terminal apparatus including: a coding unit configured to code a payload of uplink control information (UCI) and to perform rate matching of coded bits of the payload; and a transmitter configured to transmit the UCI, wherein the payload includes part or all of hybrid automatic repeat request-acknowledgement (HARQ-ACK) information, a scheduling request, and channel state information (CSI), a length $E_{UCI}$ of an output sequence of the rate matching is given based on a first number $O_{CRC}$ of cyclic redundancy check (CRC) bits, the first number $O_{CRC}$ of CRC bits is given based on a size of the payload, and a size of second CRC bits added to the payload is given based on the size of the payload and the length $E_{UCI}$ of the output sequence of the rate matching.

(2) A second aspect according to the present embodiment is a terminal apparatus including a transmitter configured to transmit a physical uplink control channel (PUCCH), wherein a number $N_{CSI\text{-}part2}^{reported}$ of pieces of channel state information (CSI) part 2 transmitted on the PUCCH is given such that a total sum of the $N_{CSI\text{-}part2}^{reported}+1$ pieces of CSI part 2 and a first number $O_{CRC,CSI\text{-}part2}$ of cyclic redundancy check (CRC) bits is larger than $W_M$, the first number of CRC bits is given based on the total sum of the $N_{CSI\text{-}part2}^{reported}+1$ pieces of CSI part 2, and the $N_{CSI\text{-}part2}^{reported}+1$ pieces of CSI part 2 include pieces of CSI part 2 with priorities from a first priority to an $N_{CSI\text{-}part2}^{reported}+1$-th priority.

(3) In the second aspect according to the present embodiment, the number $N_{CSI\text{-}part2}^{reported}$ pieces of CSI part 2 transmitted on the PUCCH is given such that the sum of the total sum of the $N_{CSI\text{-}part2}^{reported}$ pieces of CSI part 2 and a second number $O_{CRC,CRI\text{-}part2}$ of CRC bits is smaller than or equal to $W_M$, the second number of CRC bits is given based on the total sum of the $N_{CSI\text{-}part2}^{reported}$ pieces of CSI part 2, and the $N_{CSI\text{-}part2}^{reported}$ pieces of CSI part 2 include the pieces of CSI part 2 with the priorities from the first priority to the $N_{CSI\text{-}part2}^{reported}$-th priority.

(4) In the second aspect according to the present embodiment, the transmitter transmits the PUCCH including the $N_{CSI\text{-}part2}^{reported}$ pieces of CSI part 2, and a number of CRC bits added to the $N_{CSI\text{-}part2}^{reported}$ pieces of CSI part 2 is the second number of CRC bits.

(5) A third aspect according to the present embodiment is a base station apparatus including a receiver configured to decode a payload of uplink control information (UCI) and receive the UCI, wherein the payload includes part or all of hybrid automatic repeat request-acknowledgement (HARQ-ACK) information, a scheduling request, and channel state information (CSI), a length $E_{UCI}$ of an output sequence of rate matching of coded bits in the payload by a terminal apparatus is given based on a first number $O_{CRC}$ of cyclic redundancy check (CRC) bits, the first number $O_{CRC}$ of CRC bits is given based on a size of the payload, and a size of second CRC bits added to the payload is given based on the size of the payload and the length $E_{UCI}$ of the output sequence of the rate matching. Here, the base station apparatus may decode the payload of the UCI based on the length $E_{UCI}$ of the output sequence.

(6) A fourth aspect according to the present embodiment is a base station apparatus including a receiver configured to receive a physical uplink control channel (PUCCH), wherein a number $N_{CSI\text{-}part2}^{reported}$ of pieces of channel state information (CSI) part 2 transmitted on the PUCCH is given such that a sum of a total sum of the $N_{CSI\text{-}part2}^{reported}+1$ pieces of CSI part 2 and a first number $O_{CRC,CSI\text{-}part2}$ of cyclic redundancy check (CRC) bits is larger than $W_M$, the first number of CRC bits is given based on the total sum of the $N_{CSI\text{-}part2}^{reported}+1$ pieces of CSI part 2, and the $N_{CSI\text{-}part2}^{reported}+1$ pieces of CSI part 2 include pieces of CSI parts 2 with priorities from a first priority to an $N_{CSI\text{-}part2}^{reported}+1$-th priority.

(7) In the fourth aspect according to the present embodiment, the number $N_{CSI\text{-}part2}^{reported}$ of pieces of CSI part 2 transmitted on the PUCCH is given such that the sum of the total sum of the $N_{CSI\text{-}part2}^{reported}$ pieces of CSI part 2 and a second number $O_{CRC,CRI\text{-}part2}$ of CRC bits is smaller than or equal to $W_M$, the second number of CRC bits is given based on the total sum of the $N_{CSI\text{-}part2}^{reported}$ pieces of CSI part 2, and the $N_{CSI\text{-}part2}^{reported}$ pieces of CSI part 2 include the pieces of CSI part 2 with the priorities from the first priority to the $N_{CSI\text{-}part2}^{reported}$-th priority.

(8) In the fourth aspect according to the present embodiment, the receiver receives the PUCCH including the $N_{CSI\text{-}part2}^{reported}$ pieces of CSI part 2, and a number of CRC bits added to the $N_{CSI\text{-}part2}^{reported}$ pieces of CSI part 2 is the second number of CRC bits.

This allows the terminal apparatus 1 and the base station apparatus 3 to efficiently perform the uplink transmission and reception.

A program running on the base station apparatus 3 and the terminal apparatus 1 according to one aspect of the present invention may be a program (program that causes a computer to function) that controls a Central Processing Unit (CPU) and the like, such that the program realizes the functions of the above-described embodiment according to one aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In such a case, a program for realizing such control functions may be recorded on a computer-readable recording medium to cause a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system.

The "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. The program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have a complete set of functions or functional blocks of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. A circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Visual (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

What is claimed is:

1. A terminal apparatus, comprising:
a coding unit configured to code a payload of uplink control information (UCI) and to perform rate matching of coded bits of the payload to generate an output sequence, the payload comprising at least one of hybrid automatic repeat request-acknowledgement (HARQ-ACK) information, a scheduling request, and channel state information (CSI); and
a transmitter configured to transmit the output sequence, wherein the coding unit is further configured to:
determine a number of first cyclic redundancy check (CRC) bits based on a size of the payload,
the number of first CRC bits being equal to 0 in a case that the size of the payload is less than 12 bits,
the number of first CRC bits being equal to 6 in a case that the size of the payload is equal to or larger than 12 bits and less than 20 bits, and
the number of first CRC bits being equal to 11 in a case that the size of the payload is equal to or larger than 20 bits;
determine a length of the output sequence based on the size of the payload, the number of first CRC bits, and a maximum coding rate; and
determine a number of second CRC bits which are added to the payload before the payload is coded, based on the size of the payload and the length of the output sequence.

2. A base station apparatus comprising:
a receiver configured to decode a payload of uplink control information (UCI) and receive the UCI, wherein
the payload includes at least one of hybrid automatic repeat request-acknowledgement (HARQ-ACK) information, a scheduling request, and channel state information (CSI), and the receiver is further configured to:
determine a number of first cyclic redundancy check (CRC) bits based on a size of the payload,
the number of first CRC bits being equal to 0 in a case that the size of the payload is less than 12 bits,
the number of first CRC bits being equal to 6 in a case that the size of the payload is equal to or larger than 12 bits and less than 20 bits, and
the number of first CRC bits being equal to 11 in a case that the size of the payload is equal to or larger than 20 bits;
determine a length of an output sequence of a terminal apparatus performing rate matching of coded bits in the payload based on the size of the payload, the number of first CRC bits, and a maximum coding rate; and
determine a number of second CRC bits which are added to the payload before the payload is coded, based on the size of the payload and the length of the output sequence.

3. A communication method used for a terminal apparatus, the communication method comprising:
coding a payload of uplink control information (UCI), the payload comprising at least one of hybrid automatic repeat request-acknowledgement (HARK-ACK) information, a scheduling request, and channel state information (CSI);
performing rate matching of coded bits in the payload to generate an output sequence; and
transmitting the output sequence, wherein coding the payload of the UCI comprises:
determining a number of first cyclic redundancy check (CRC) bits based on a size of the payload,
the number of first CRC bits being equal to 0 in a case that the size of the payload is less than 12 bits,
the number of first CRC bits being equal to 6 in a case that the size of the payload is equal to or larger than 12 bits and less than 20 bits, and
the number of first CRC bits being equal to 11 in a case that the size of the payload is equal to or larger than 20 bits;
determining a length of the output sequence based on the size of the payload, the number of first number CRC bits, and a maximum coding rate; and
determining a number of second CRC bits which are added to the payload before the payload is coded, based on the size of the payload and the length of the output sequence.

* * * * *